United States Patent
Jang et al.

(10) Patent No.: US 9,066,090 B2
(45) Date of Patent: Jun. 23, 2015

(54) STEREOSCOPIC IMAGE DISPLAY AND METHOD FOR MANUFACTURING THE SAME

(75) Inventors: Juhoon Jang, Seoul (KR); Jinyeong Kim, Gyeonggi-do (KR); Heeyoung Chae, Gyeonggi-do (KR); Taewoong Moon, Gyeonggi-do (KR); Sungpil Ryu, Gyeonggi-do (KR); Meeran Park, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 56 days.

(21) Appl. No.: 13/550,770

(22) Filed: Jul. 17, 2012

(65) Prior Publication Data
US 2013/0063687 A1 Mar. 14, 2013

(30) Foreign Application Priority Data

Sep. 9, 2011 (KR) .................. 10-2011-0091830

(51) Int. Cl.
| | | |
|---|---|---|
| *G02F 1/1335* | (2006.01) | |
| *H04N 13/04* | (2006.01) | |
| *G02B 27/22* | (2006.01) | |
| *G02B 5/20* | (2006.01) | |
| *G02F 1/13363* | (2006.01) | |

(52) U.S. Cl.
CPC ........ *H04N 13/0422* (2013.01); *G02B 27/2214* (2013.01); *H04N 13/0404* (2013.01); *G02F 1/133512* (2013.01); *G02B 5/201* (2013.01); *G02B 27/2228* (2013.01); *G02B 2207/123* (2013.01); *H04N 13/0434* (2013.01); *H04N 2213/001* (2013.01); *G02F 2001/133631* (2013.01)

(58) Field of Classification Search
CPC .......... G02B 27/2214; H04N 13/0404; G02F 1/133512
USPC ................................................... 349/15, 110
See application file for complete search history.

(56) References Cited

U.S. PATENT DOCUMENTS

| | | | | |
|---|---|---|---|---|
| 2006/0279687 | A1* | 12/2006 | Park et al. | ...... 349/142 |
| 2010/0265433 | A1* | 10/2010 | Hoshi | ............ 349/62 |
| 2010/0289884 | A1 | 11/2010 | Kang | |

(Continued)

FOREIGN PATENT DOCUMENTS

| | | |
|---|---|---|
| CN | 101896842 A | 11/2010 |
| CN | 101900933 A | 12/2010 |
| JP | 10-227998 A | 8/1998 |

(Continued)

OTHER PUBLICATIONS

Korean Office Action dated Mar. 20, 2013 for corresponding Korean Patent application No. 10-2011-0091830.

(Continued)

*Primary Examiner* — Phu Vu
(74) *Attorney, Agent, or Firm* — Morgan, Lewis & Bockius LLP

(57) ABSTRACT

A stereoscopic image display and a method for manufacturing the same are provided. The stereoscopic image display comprises: a thin film transistor array substrate; a color filter substrate facing the thin film transistor array substrate, and comprising black matrix; first black stripes formed on the color filter substrate, and formed at positions corresponding to the black matrix; and a patterned retarder film formed on the first black stripes.

25 Claims, 30 Drawing Sheets

(56) References Cited

U.S. PATENT DOCUMENTS

2012/0268435 A1 10/2012 Hoshi
2012/0287504 A1 11/2012 Jang et al.

FOREIGN PATENT DOCUMENTS

| | | |
|---|---|---|
| JP | H11337730 A | 12/1999 |
| JP | 2009237466 A | 10/2009 |
| JP | 2010096900 A | 4/2010 |
| JP | 2011-158574 A | 8/2011 |
| KR | 10-2005-0055334 A | 6/2005 |
| KR | 10-2012-0059953 A | 6/2012 |

OTHER PUBLICATIONS

United Kingdom Office Action dated Jan. 25, 2013 for corresponding GB Patent application No. 1213411.0.

Office Action dated Sep. 24, 2013 from the Japanese Patent Office in counterpart Japanese application No. 2012-180774.

Office Action dated Jun. 6, 2014 from the Taiwanese Patent Office in counterpart Taiwanese application No. 101132802.

First Notification of Office Action dated Oct. 8, 2014 from The State Intellectual Property Office of China in counterpart Chinese application No. 201210270364.2.

* cited by examiner (a)  (b)

STEREOSCOPIC IMAGE DISPLAY AND METHOD FOR MANUFACTURING THE SAME

This application claims the priority benefit of Korea Patent Application No. 10-2011-0091830 filed on Sep. 9, 2011, which is incorporated herein by reference for all purpose as if fully set herein.

BACKGROUND OF THE INVENTION

1. Field of the Invention

Embodiments of the invention relates to a stereoscopic image display and a method for manufacturing the same, and more particularly, to a stereoscopic image display, which can reduce the width of black matrix, improve the aperture ratio and brightness of the display, and facilitate the manufacturing process, and a method for manufacturing the same.

2. Discussion of the Related Art

A stereoscopic image display displays a stereoscopic image by using a stereoscopic technique or an autostereoscopic technique.

The stereoscopic technique, which uses a binocular parallax image between left and right eyes of a user and has a high stereoscopic effect, includes a glasses type and a non-glasses type which have been put to practical use. In the glasses type, the binocular parallax image is displayed on a direct view-based display device or a projector by changing a polarization direction or in a time division manner, and polarization glasses or liquid crystal shutter glasses are used to implement stereoscopic images. In the non-glasses type, generally, an optical plate such as a parallax barrier or the like for separating an optical axis of the binocular parallax image is provided at the front surface or rear surface of a display screen.

FIG. 1 is a view showing a related art stereoscopic image display.

Referring to FIG. 1, the glasses type stereoscopic image display 1 comprises a thin film transistor array substrate 10, a color filter substrate 12 comprising color filters 13 and a black matrix 14, and a liquid crystal layer 15 interposed between the thin film transistor array substrate 10 and the color filter substrate 12. Also, upper and lower polarizing plates 16A and 16B are positioned on the thin film transistor array substrate 10 and the color filter substrate 12, a patterned retarder 17 is positioned on the upper polarizing plate 16A, and a surface-treated protective film 18 is positioned on the patterned retarder 17.

The glasses type stereoscopic image display 1 alternately displays a left image and a right image and switches polarization characteristics incident to polarization glasses via the patterned retarder 17. Thereby, the glasses type can implement stereoscopic images by spatially dividing left images and right images.

When the stereoscopic image display implements a stereoscopic image, a vertical viewing angle is determined by the width of black matrix, the distance between the color filters and the patterned retarder, and so on. Although the related art stereoscopic image display implements a vertical viewing angle of 26 degrees by increasing the width of black matrix, the increase in the width of the black matrix may lower the aperture ratio and brightness.

SUMMARY

An aspect of this document is to provide a stereoscopic image display, which can reduce the width of black matrix and improve the aperture ratio and brightness of the display, and a method for manufacturing the same.

A stereoscopic image display according to an exemplary embodiment of the present invention may comprise: a thin film transistor array substrate; a color filter substrate facing the thin film transistor array substrate, and comprising black matrix; first black stripes formed on the color filter substrate, and formed at positions corresponding to the black matrix; and a patterned retarder film formed on the first black stripes.

Furthermore, a method for manufacturing a stereoscopic image display according to an exemplary embodiment of the present invention may comprise: forming a thin film transistor array substrate; forming black matrix on a surface of a color filter substrate; forming color filters on the black matrix; joining the thin film transistor array substrate and the color filter substrate together; forming first black stripes on the other surface of the color filter substrate, at positions corresponding to the black matrix; and bonding a patterned retarder film onto the first black stripes.

Furthermore, a method for manufacturing a stereoscopic image display may comprise: forming a thin film transistor array substrate; forming first black stripes on a surface of a color filter substrate; forming black matrix on the other surface of the color filter substrate, at positions corresponding to the first black stripes; forming color filters on the black matrix; and bonding a patterned retarder film onto the first black stripes.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION

Reference will now be made in detail embodiments of the invention examples of which are illustrated in the accompanying drawings.

Hereinafter, exemplary embodiments of the present invention will be described in detail below with reference to the accompanying drawings.

Figure 2:
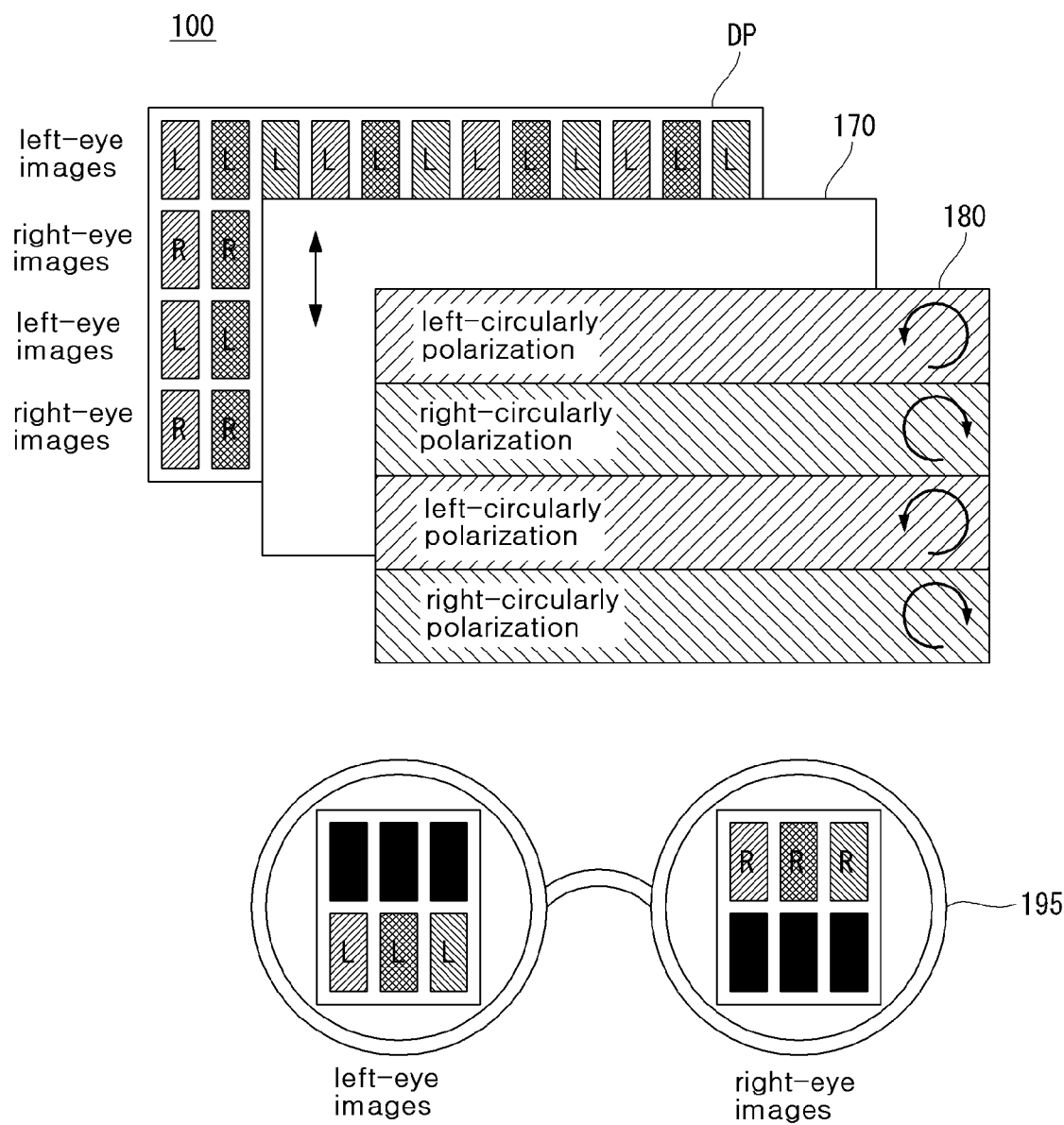
FIG. 2 is a view showing a stereoscopic image display according to an exemplary embodiment of the present invention.

FIG. 2 is a view showing a stereoscopic image display according to an exemplary embodiment of the present invention.

Referring to FIG. 2, the stereoscopic image display 100 according to an exemplary embodiment of the present invention comprises a display panel DP, a polarization plate 170, a patterned retarder 180, and polarization glasses 195.

The display panel DP may be implemented by a flat display device such as a liquid crystal display (LCD), a field emission display (FED), a plasma display panel (PDP), an electroluminescence device (EL), and so on.

When the display panel DP is implemented as a liquid crystal display panel, the stereoscopic image display 100 may further comprise a backlight unit disposed under the display panel DP and a polarization plate (not shown) disposed between the display panel DP and the backlight unit. The patterned retarder 180 and the polarization glasses 195 are stereoscopic image driving elements, which realize a binocular parallax by spatially dividing left images and right images.

The display panel DP has two glass substrates and a liquid crystal layer sandwiched therebetween. A thin film transistor array is formed on the thin film transistor array substrate. A color filter array is formed on the color filter substrate. The color filter array comprises a black matrix, color filters, etc. The polarization plate 170 is attached to the color filter substrate, and the polarization plate is attached to the thin film transistor array substrate as well.

Left-eye images L and right-eye images R are alternately displayed on the display panel DP in a line-by-line manner. The polarization plate 170 is an analyzer attached onto the color filter substrate of the display panel DP, which transmits only a specific linearly polarized light out of incident light passed through the liquid crystal layer of the display panel DP.

The patterned retarder 180 comprises first retarder patterns and second retarder patterns which are alternately disposed in a line-by-line manner. Preferably, the retarder patterns are disposed in a line-by-line manner so as to make an angle of (+)45 degrees and (−)45 degrees with an absorption axis of the polarization plate 170.

Each of the retarder patterns delays the phase of light by λ(wavelength)/4 by means of a birefringence medium. The optical axis of the first retarder patterns and the optical axis of the second retarder pattern are orthogonal to each other.

Accordingly, the first retarder patterns are disposed to face lines for displaying a left-eye image on the display panel DP, and convert the light of the left-eye image into first polarized light (circularly polarized light or linearly polarized light). The second retarder patterns are disposed to face lines for displaying a right-eye image on the display panel DP, and convert the light of the right-eye image into second polarized light (circularly polarized light or linearly polarized light). In one example, the first retarder patterns may be implemented by a polarization filter for transmitting left-circularly polarized light, and the second retarder patterns may be implemented by a polarization filter for transmitting right-circularly polarized light.

A polarization film for allowing only the first polarization component to pass therethrough is bonded to the left-eye of the polarization glasses 195, and a polarization film for allowing only the second polarization component to pass therethrough is bonded to the right-eye of the polarization glasses 195. Therefore, a viewer wearing the polarization glasses 195 sees only a left-eye image with the left eye and only a right-eye image with the right eye, thus feeling that an image displayed on the display panel DP is a stereoscopic image.

Hereinafter, a stereoscopic image display and a method for manufacturing the same according to exemplary embodiments of the present invention will be described in more detail below. In what follows, the components common to those in the above-described stereoscopic image display are denoted by like reference numerals, so the descriptions thereof will be made briefly.

Figure 3:
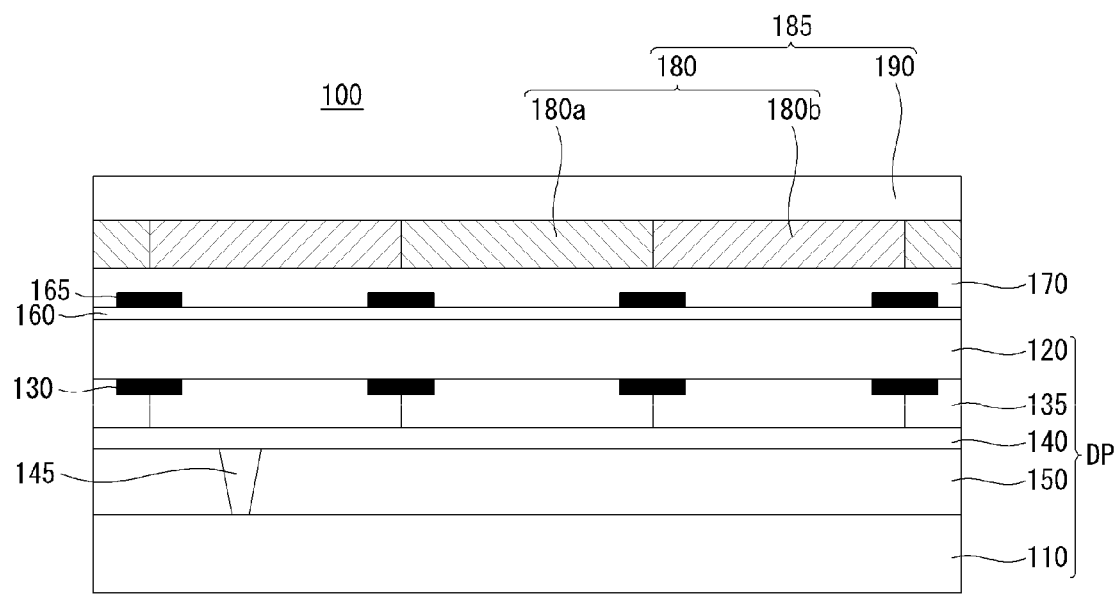
FIGS. 3 to 5 are views showing a stereoscopic image display according to a first exemplary embodiment of the present invention.
Figure 4:
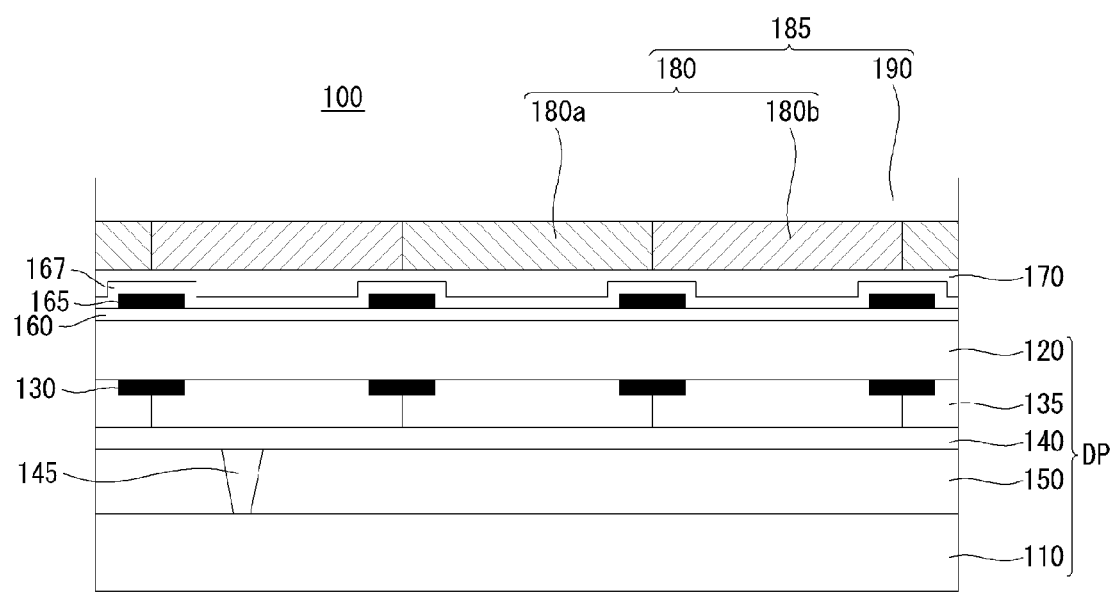
Figure 5:
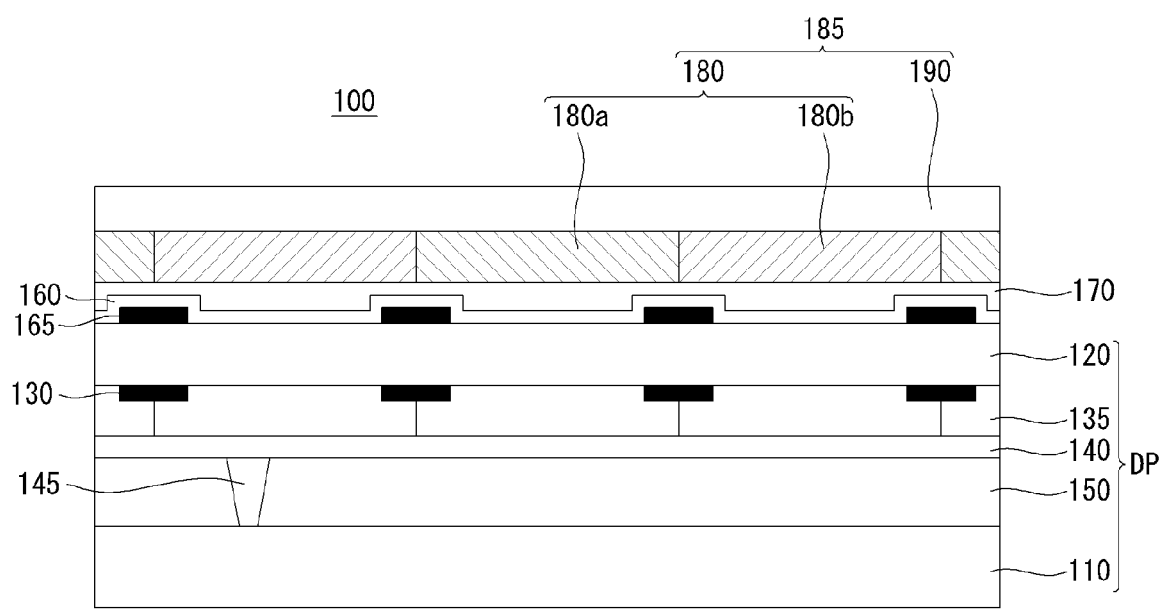
Figure 6:
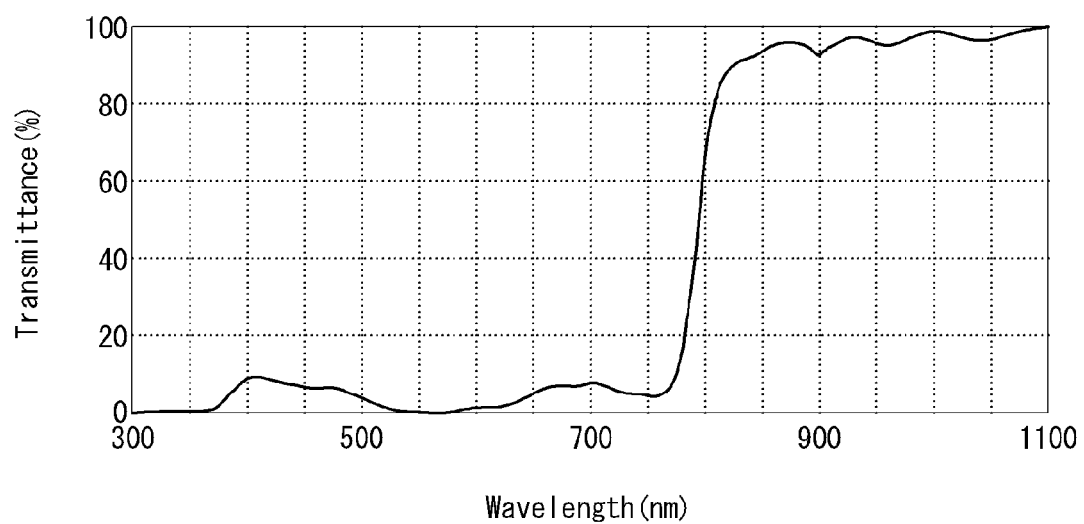
FIG. 6 is a graph showing the transmittance relative to the wavelength range of a photosensitive resin composition of the present invention.
Figure 7:
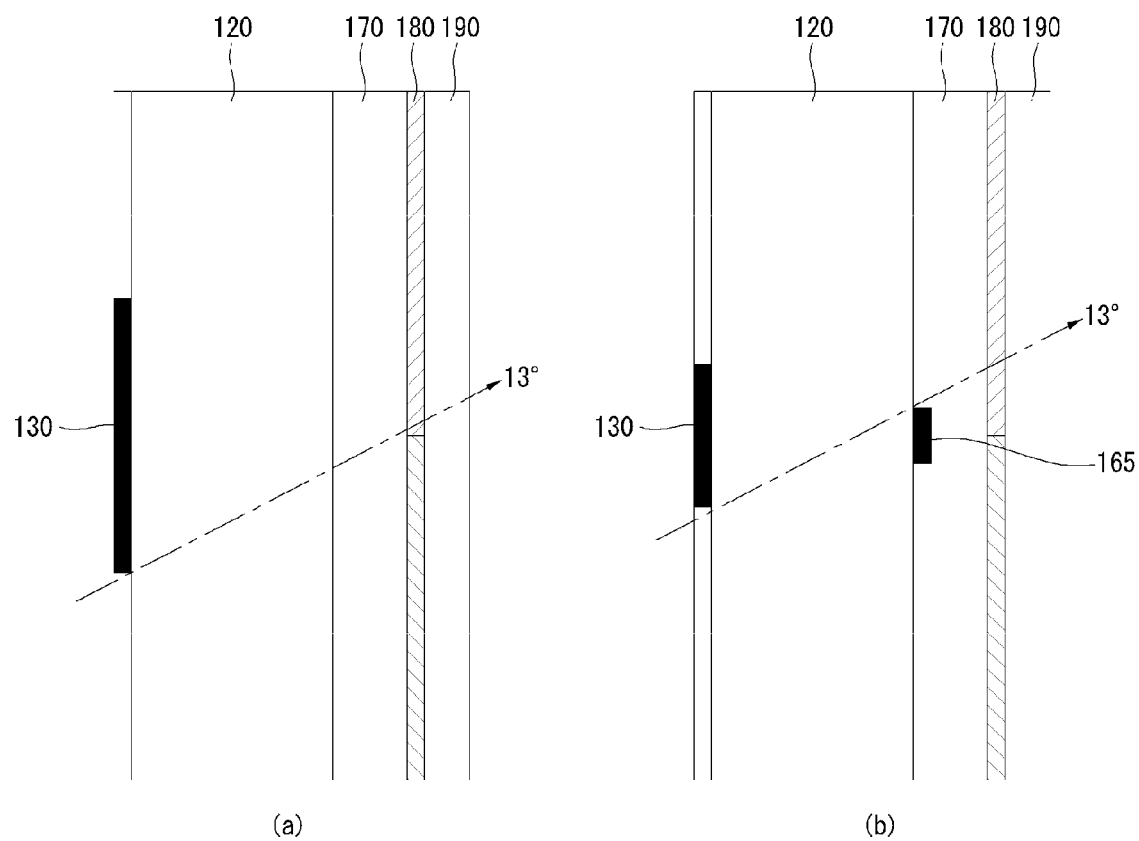
FIG. 7 is a pattern diagram showing a viewing angle of the stereoscopic image display.

FIGS. 3 to 5 are views showing a stereoscopic image display according to a first exemplary embodiment of the present invention, FIG. 6 is a graph showing the transmittance relative to the wavelength range of a photosensitive resin composition, and FIG. 7 is a pattern diagram showing a viewing angle of the stereoscopic image display.

Referring to FIG. 3, the stereoscopic image display 100 according to the first exemplary embodiment of the present invention constitutes a display panel DP comprising a thin film transistor array substrate 110, a color filter substrate 120 facing the thin film transistors array substrate 110, and a liquid crystal layer 150 interposed therebetween.

More specifically, the thin film transistor array substrate 110 has a thin film transistor array. The thin film transistor array comprises a plurality of data lines supplied with R, G, and B data voltages, a plurality of gate lines (or scan lines) which intersect the data lines and are sequentially supplied with gate pulses (scan pulses), a plurality of thin film transistors formed at the intersections of the data lines and the gate lines, a plurality of pixel electrodes for charging data voltages in liquid crystal cells, and a storage capacitor connected to the pixel electrodes to maintain the voltages of the liquid crystal cells.

Common electrodes facing the pixel electrodes to form an electric field are disposed on the color filter substrate 120 in a vertical electric field driving type such as a TN (twisted nematic) mode and a VA (vertical alignment) mode, and are disposed on the thin film transistor array substrate 110 along with the pixel electrodes in a horizontal electric field type such as an IPS (in plane switching) mode and an FFS (fringe field switching) mode.

R, G, and B color filters 135 and a plurality of black matrix 130 disposed therebetween are formed on the color filter substrate 120, and an overcoat layer 140 for protecting the color filters 135 and the black matrix 130 are formed thereon. The color filters 135 function to convert light emitted from the backlight unit and transmitted through the liquid crystal layer 150 into red, green, and blue. Also, the color filters 135, with the black matrix 130 respectively disposed thereon, function to separate a left-eye image and a right-eye image. The overcoat layer 140 functions to reduce a difference in level between the color filters 135 and protect the color filters 135.

In the thin film transistor array substrate 110 and the color filter substrate 120, alignment layers for setting a pre-tilt angle of liquid crystals are respectively formed on the inner surfaces contacting the liquid crystal layer 150, and a column spacer 145 for keeping a cell gap of the liquid crystal cells is formed.

On the outer surfaces of the color filter substrate 120, a rear ITO 160, first black stripes 165 formed on the rear ITO 160, the polarization plate 170 formed on the first black stripe 165, and a patterned retarder film 185 formed on the polarization plate 170 are formed.

The rear ITO 160 externally discharges static electricity generated on the color filter substrate 120, and is formed on the entire surface of the color filter substrate 120. The first black stripes 165 corresponding to the black matrix 130 are formed on the rear ITO 160. The above-mentioned polarization plate 170 is formed on the first black stripe 165 to polarize the light transmitted through the display panel DP. Additionally, as shown in FIG. 4, an adhesive 167 is formed on the polarization plate 170 and bonded onto the first black stripe 165 and the rear ITO 160.

The patterned retarder film 185 is positioned on the polarization plate 170. Of the patterned retarder film, as described above, the first retarder patterns 180a and the second retarder patterns 180b are formed on the protective film 190. The first retarder patterns 180a are disposed to face lines for displaying a left-eye image on the display panel DP, and convert the light of the left-eye image into first polarized light (circularly polarized light or linearly polarized light). The second retarder patterns 180b are disposed to face lines for displaying a right-eye image on the display panel DP, and convert the light of the right-eye image into second polarized light (circularly polarized light or linearly polarized light). In one example, the first retarder patterns 180a may be implemented by a polarization filter for transmitting left-circularly polarized light, and the second retarder patterns 180b may be implemented by a polarization filter for transmitting right-circularly polarized light.

The first black stripes 165 are formed at positions corresponding to the black matrix 130. Here, in order to prevent lowering of the aperture ratio of the display, the width of the first black stripes 165 is less than or equal to the width of the black matrix 130, and the area of the first black stripes 165 is less than or equal to the area of the black matrix 130 within the regions corresponding to the black matrix 130.

Meanwhile, referring to FIG. 5, unlike the above-described stereoscopic image display 100, the first black stripes 165 may be formed on the outer surface of the color filter substrate 120, and the rear ITO 160 may be formed to have a structure that covers the first black stripes 165. Also, the polarization plate 170 is formed on the rear ITO 160, and the patterned retarder film 185 is positioned on the polarization plate 170. As described above, of the patterned retarder film 185, the first retarder films 180a and the second retarder films 180b are formed on the protective film 190.

The above-described black matrix 130 and first black stripe 165 according to the present invention are made of a photosensitive resin composition containing carbon black. More specifically, the photosensitive resin composition used as a material for the black matrix 130 and the first black stripes 165 may comprise a pigment, a binder, a multifunctional monomer, a photoinitiator, a dispersant, and an additive.

The pigment may comprise at least one of a black pigment and an organic pigment. The black pigment may be carbon black, but is not specifically limited if it has a light blocking effect. Examples of the black pigment may comprise channel black, furnace black, thermal black, and lamp black. Examples of the organic pigment may comprise an asoluble azo pigment, an insoluble azo pigment, a phthalocyanine pigment, a quinacridone pigment, an isoindolinone pigment, a perylene pigment, a perinone pigment, a dioxadine pigment, an anthraquinone pigment, a dianthraquinonyl pigment, ananthrapyrimidine pigment, an anthanthrone pigment, an indanthrone pigment, a flavanthrone pigment, a pyranthrone pigment, and a diketopyrrolopyrrole pigment.

The binder is for improving the binding characteristics of the resin composition, and may be a material capable of copolymerizing with other monomers. The binder may be one or more selected from the group consisting of acrylic resin, polyimide resin, phenol resin, and cardo-type resin. Moreover, these resins may be compounds containing an acid group or an epoxy group.

The multifunctional monomer is a compound capable of being copolymerized by a photoinitiator, and may be an acrylate monomer. Examples of the multifunctional monomer may comprise ethylene glycol diacrylate, 1,4-cyclohexanediol acrylate, trimethylol triacrylate, trimethylolpropanetriacrylate, pentaerythritoltriacrylate, tetraethyleneglycoldiacrylate, dipentaerythritoltriacrylate, dipentaerythritoltetraacrylate, sorbitoltriacrylate, sorbitoltetraacrylate, vinyl acetate, triaryl cyanurate, and so on. In addition to these monomers, polymers, such as dimers and trimers thereof, can be useful.

The photoinitator is a material that generates radicals by light and initiates polymerization, and may be one or more selected from the group consisting of an acetophenone-based compound, a biimidazole-based compound, a triazine-based compound, and an oxime-based compound, preferably, an oxime-based compound.

The dispersant is for preventing elution of the pigment component in the resin composition, and may be a surface-active agent. Examples of the dispersing agent may comprise silicon-based, fluorine-based, ester-based, cation-based, anion-based, nonionic, and positive surface-active agents.

The additive may be added if needed to the resin composition of the present invention, and may comprise a filler, a hardening agent, an oxidant, an UV absorbent, and so on.

As described, the photosensitive resin composition used as a material for the black matrix 130 and the first black stripes 165 may comprise a pigment, a binder, a multifunctional monomer, a photoinitiator, a dispersant, and an additive. Referring to FIG. 6, the photosensitive resin composition of the present invention shows a slight transmittance in visible light because it contains a pigment component, but may show a transmittance of 60% or greater in a wavelength range of 800 nm or more. Accordingly, the present invention may facilitate the manufacturing process to be described later by manufacturing the black matrix 130 and the first black stripes 165 as the photosensitive resin composition. A detailed description of which will be described later.

Referring to FIG. 7(a), a related art display device having a large width of the black matrix 130 without the use of the first black stripe realizes a viewing angle of 13 degrees (vertical viewing angle of 26 degrees). On the other hand, as shown in FIG. 7(b), the stereoscopic image display of the present invention configured as described above may realize a viewing angle of 13 degrees (vertical viewing angle of 26 degrees) while narrowing the width of the black matrix 130 by forming the first black stripes 165.

Therefore, the stereoscopic image display of the present invention has the advantage of realizing a vertical viewing angle of 26 degrees and preventing lowering of aperture ratio and brightness by forming the width of the black matrix to be narrow as it originally was and forming the first black stripe in the regions corresponding to the black matrix.

Hereinafter, a method for manufacturing the stereoscopic image display according to the first exemplary embodiment of the present invention will be described. FIGS. 8 to 15 are views showing in steps a method for manufacturing a stereoscopic image display having the above-described structure of FIG. 3. FIGS. 16 to 21 are views showing in steps a method for manufacturing a stereoscopic image display having the above-described structure of FIG. 4. FIGS. 22 to 26 are views showing in steps another method for manufacturing a stereoscopic image display having the above-described structure of FIG. 4. FIGS. 27 to 34 are views showing in steps a method for manufacturing a stereoscopic image display having the above-described structure of FIG. 5.

Figure 8:
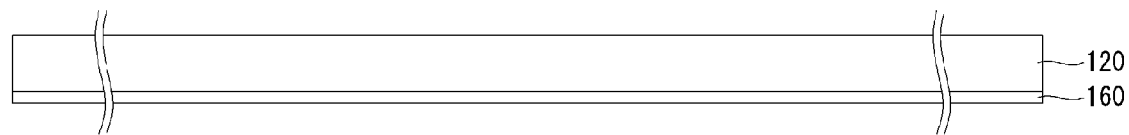
FIGS. 8 to 15 are views showing in steps a method for manufacturing a stereoscopic image display having the above-described structure of FIG. 3.
Figure 9:
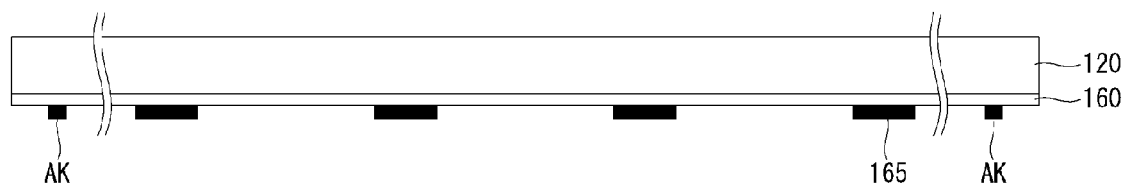

First, the method for manufacturing a stereoscopic image display having the structure of FIG. 3 will now be described. Referring to FIG. 8, ITO is deposited on an entire surface of a color filter substrate 120 to form a rear ITO 160. Referring to FIG. 9, first black stripes 165 and an align key AK are formed on the rear ITO 160. The first black stripes 165 and the align key AK are formed by applying a first black stripe composition, which is the above-described photosensitive resin composition, onto the rear ITO 160 and patterning it by photolithography. Here, the align key AK is formed on a non-display area and scribed later. The first black stripes 165 correspond to the regions in which the black matrix is to be formed later, and the width of the first black stripes 165 is less than or equal to the width of the black matrix, and the area of the first black stripes 165 is less than or equal to the area of the black matrix.

Figure 10:
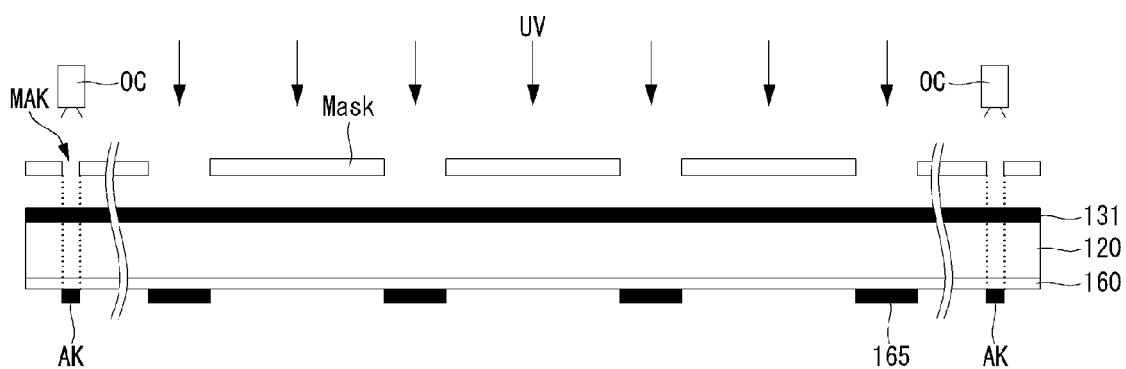

Next, referring to FIG. 10, a black matrix composition, which is the above-described photosensitive resin composition, is applied onto the other surface of the color filter substrate 120, opposite to the surface where the first black stripes 165 are formed, thereby forming a black matrix layer 131. Then, a mask for patterning the black matrix 130 is aligned. The mask may have a mask align key MAK, which can be aligned with the align key AK formed on the color filter substrate 120 through an optical camera OC. As described above, the black matrix composition of the present invention shows a transmittance of 60% or greater in the wavelength range of 800 nm or more. Accordingly, the optical camera OC may irradiate light having a wavelength range of 800 nm or more to cause the light to pass through the black matrix layer 131, and this may enable the mask align key MAK and the align key AK formed on the color filter substrate 120.

Figure 11:
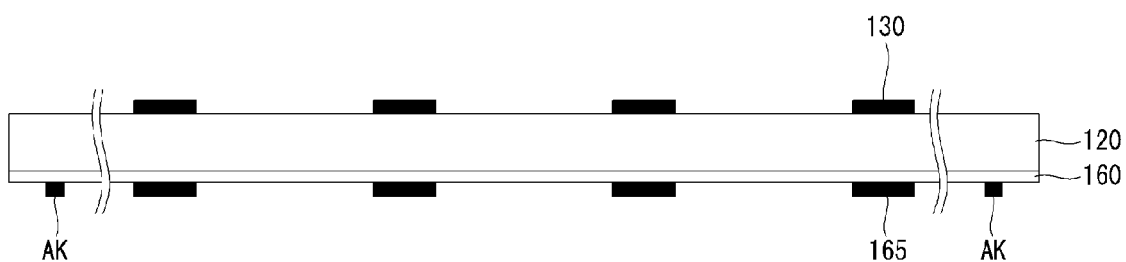

Subsequently, UV light is irradiated onto the black matrix layer 131 masked by the mask and developed, thereby forming the black matrix 130 as shown in FIG. 11.

Figure 12:
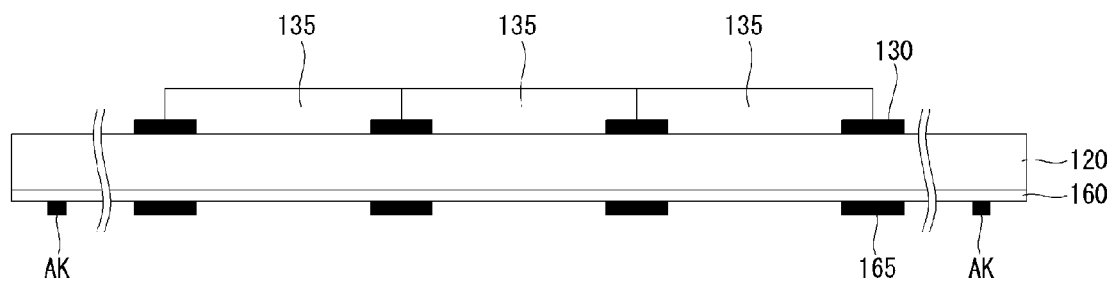
Figure 13:
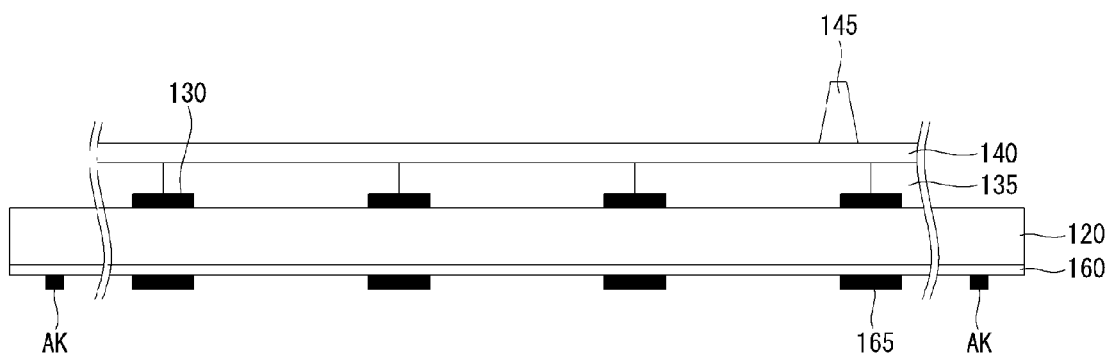
Figure 14:
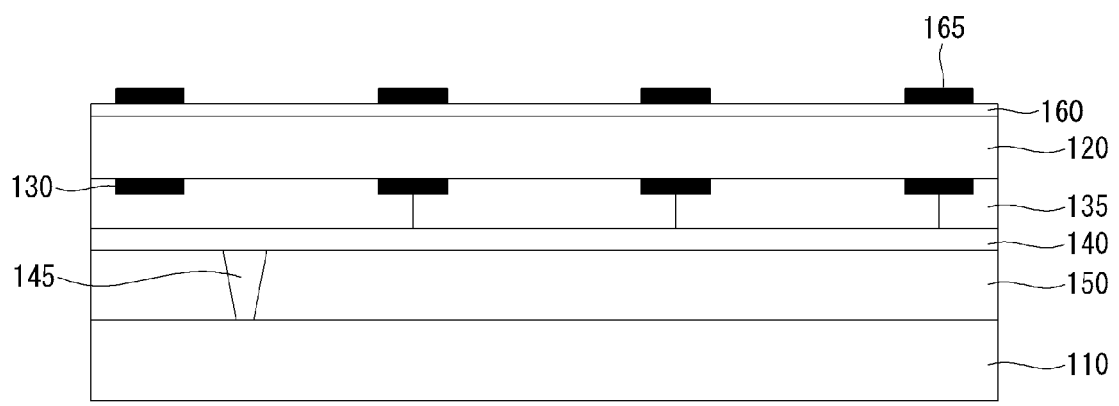
Figure 15:
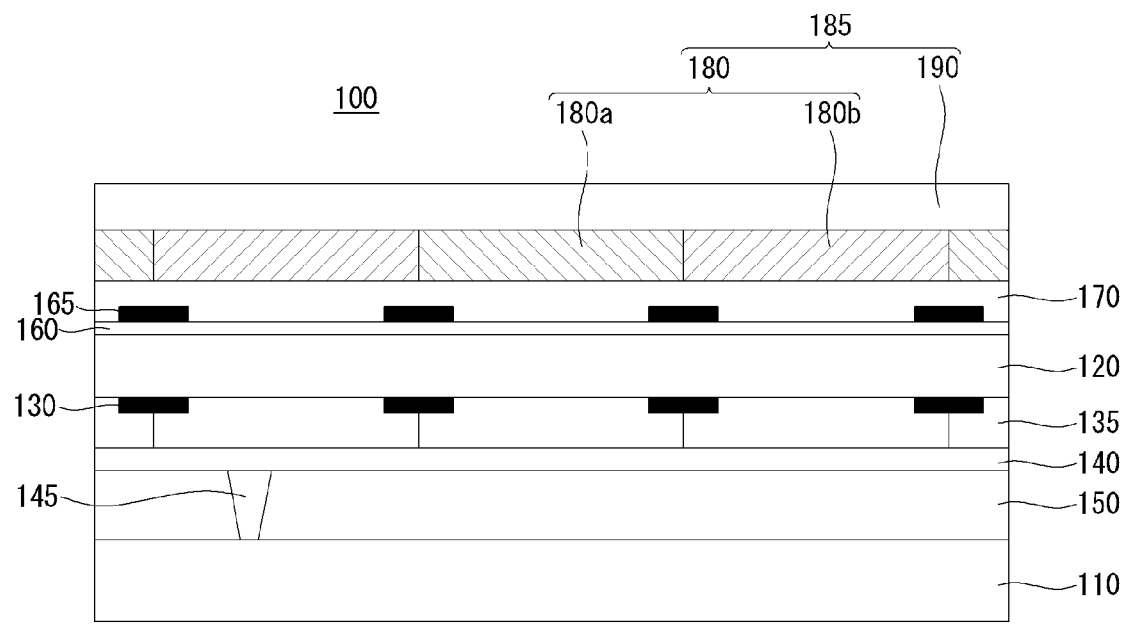

Next, referring to FIGS. 12 and 13, red, green, and blue color filters 135R, 135G, and 135B are formed on the black matrix 130, ITO is laminated on the color filters 135R, 135G, and 135B to form an overcoat layer 140, and a column spacer 145 is formed on the overcoat layer 140. Next, referring to FIG. 14, the previously manufactured color filter substrate 120 is joined to the thin film transistor array substrate 110 to form a liquid crystal layer 150. Then, the joined substrates 110 and 120 are scribed in units of cells. Hereupon, the previously formed align key AK is removed. Subsequently, referring to FIG. 15, a polarization plate 170 is attached onto the first black stripes 165 of the color filter substrate 120, and a patterned retarder film 185 with a protective film 190 attached thereto is attached onto the polarization plate 170, thereby manufacturing a stereoscopic image display.

Meanwhile, the stereoscopic image display having the structure of FIG. 4 according to the present invention may be manufactured in the following method.

Figure 16:
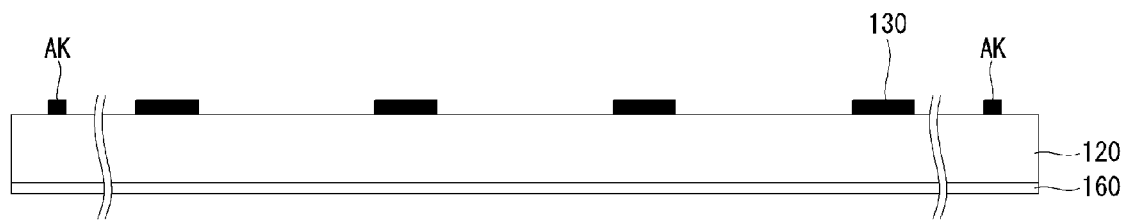
FIGS. 16 to 21 are views showing in steps a method for manufacturing a stereoscopic image display having the above-described structure of FIG. 4.

Referring to FIG. 16, ITO is deposited on an entire surface of a color filter substrate 120 to form a rear ITO 160. Subsequently, black matrix 130 and an align key AK are formed on the other surface of the color filter substrate 120. The black matrix 130 and the align key AK are formed by applying a first black stripe composition, which is the above-described photosensitive resin composition, onto the other surface of the color filter substrate 120 and patterning it by photolithography. Here, the align key AK is formed on a non-display area and scribed later.

Figure 17:
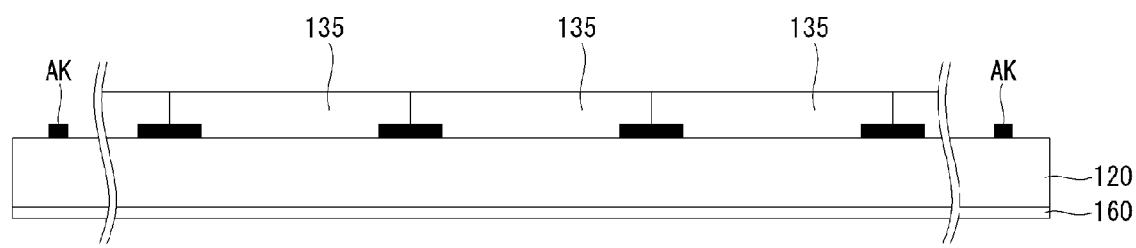
Figure 18:
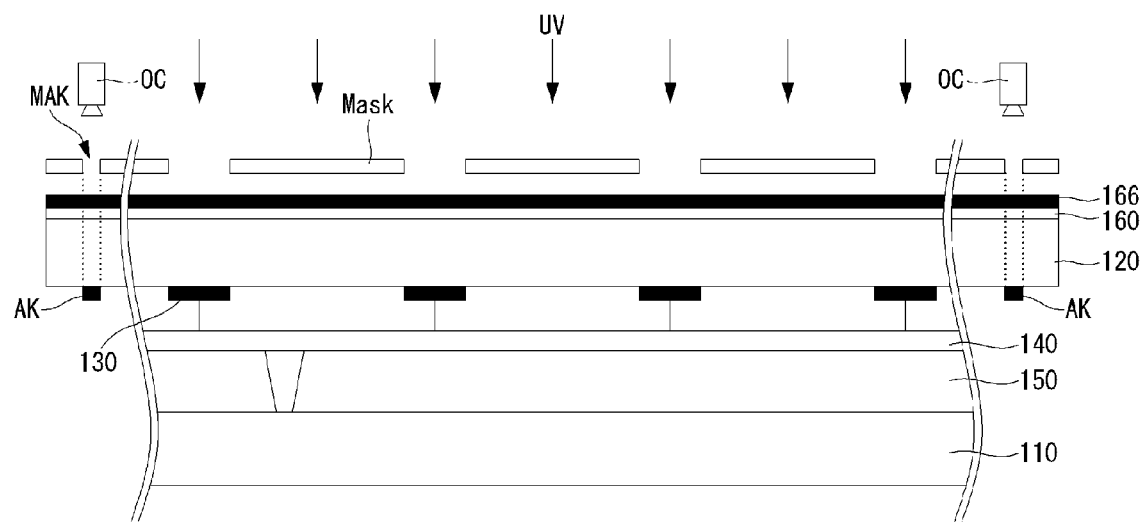

Next, referring to FIGS. 17 and 18, red, green, and blue color filters 135R, 135G, and 135B are formed on the black matrix 130, ITO is laminated on the color filters 135R, 135G, and 135B to form an overcoat layer 140, and a column spacer 145 is formed on the overcoat layer 140.

Figure 19:
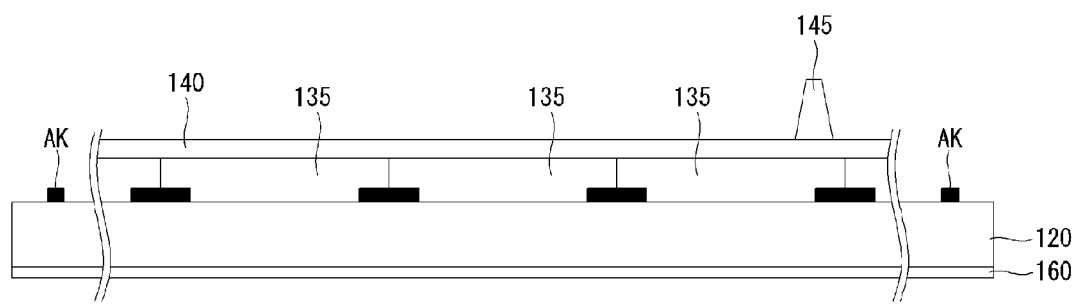

Next, referring to FIG. 19, the previously manufactured color filter substrate 120 is joined to the thin film transistor array substrate 110 to form a liquid crystal layer 150. Subsequently, a first black stripe composition, which is the above photosensitive resin composition, is applied onto the rear ITO 160 of the color filter substrate 120, to form a first black stripe layer 166. Then, a mask for patterning the first black stripes is aligned. The mask may have a mask align key MAK, which can be aligned with the align key AK formed on the color filter substrate 120 through an optical camera OC. As described above, the first black stripe composition of the present invention shows a transmittance of 60% or greater in the wavelength range of 800 nm or more. Accordingly, the optical camera OC may irradiate light having a wavelength range of 800 nm or more to cause the light to pass through the first black stripe layer 166, and this may enable the mask align key MAK and the align key AK formed on the color filter substrate 120.

Figure 20:
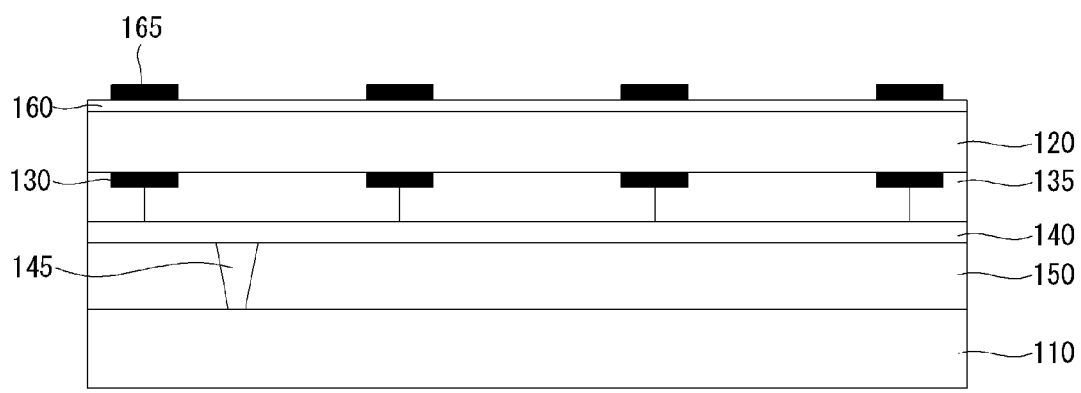
Figure 21:
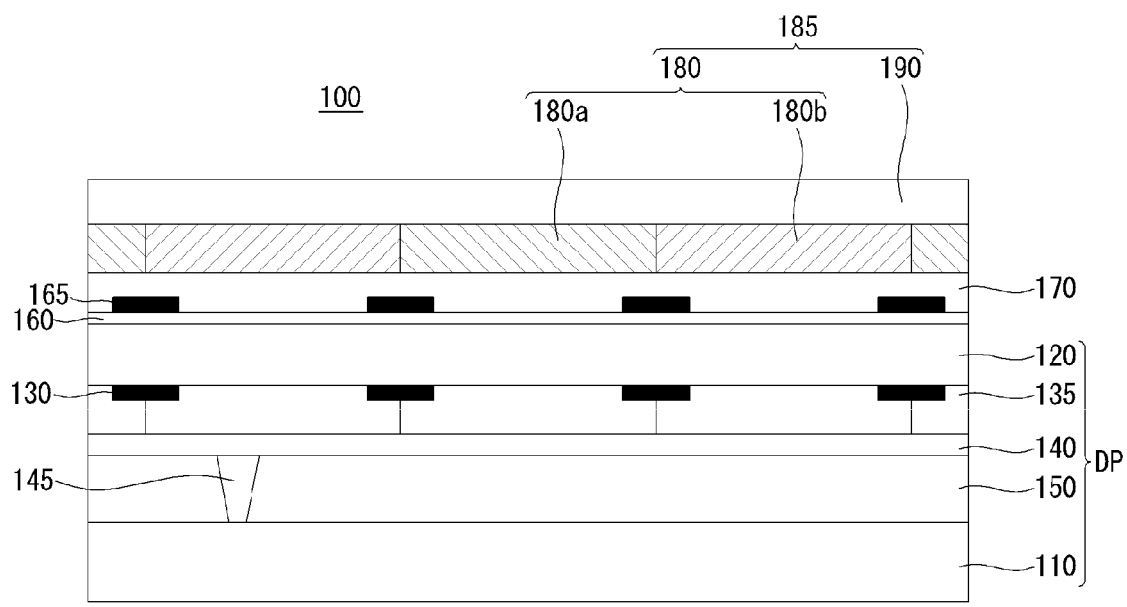

Subsequently, UV light is irradiated onto the first black stripe layer 166 masked by the mask and developed, thereby forming the first black stripes 165 as shown in FIG. 20. Then, the joined substrates 110 and 120 are scribed in units of cells. Hereupon, the previously formed align key AK is removed. Next, referring to FIG. 21, a polarization plate 170 is attached onto the first black stripes 165 of the color filter substrate 120, and a patterned retarder film 185 is attached onto the polarization plate 170, thereby manufacturing a stereoscopic image display.

Meanwhile, the stereoscopic image display having the structure of FIG. 4 according to the present invention may be manufactured in another method as follows.

Figure 22:
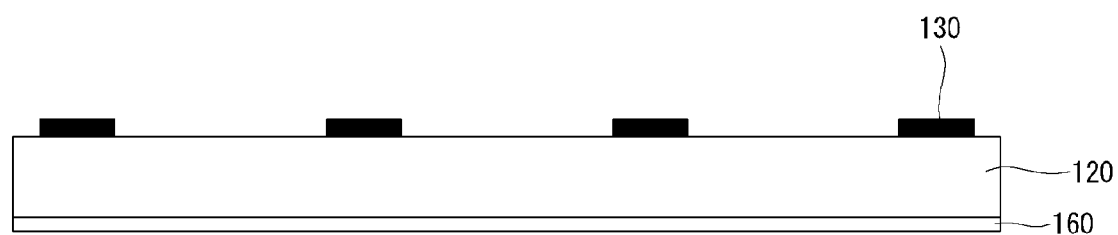
FIGS. 22 to 26 are views showing in steps another method for manufacturing a stereoscopic image display having the above-described structure of FIG. 4.
Figure 23:
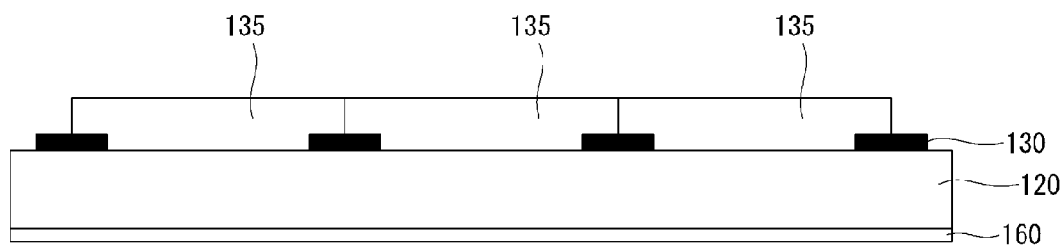
Figure 24:
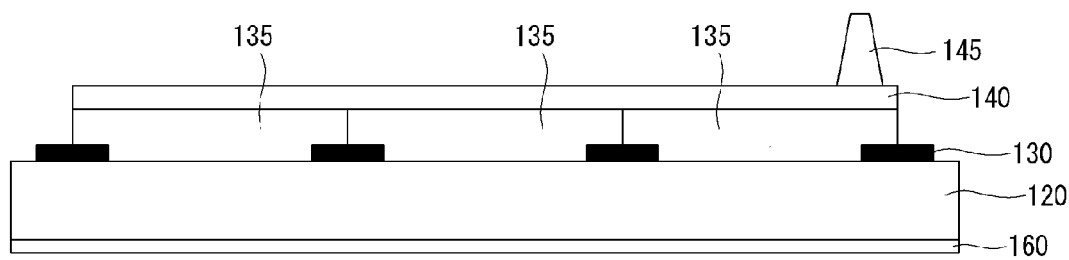

Referring to FIG. 22, ITO is deposited on an entire surface of a color filter substrate 120 to form a rear ITO 160. Subsequently, black matrix 130 is formed on the other surface of the color filter substrate 120. Next, as shown in FIGS. 23 and 24, red, green, and blue color filters 135R, 135G, and 135B are formed on the black matrix 130, ITO is laminated on the color filters 135R, 135G, and 135B to form an overcoat layer 140, and a column spacer 145 is formed on the overcoat layer 140.

Figure 25:
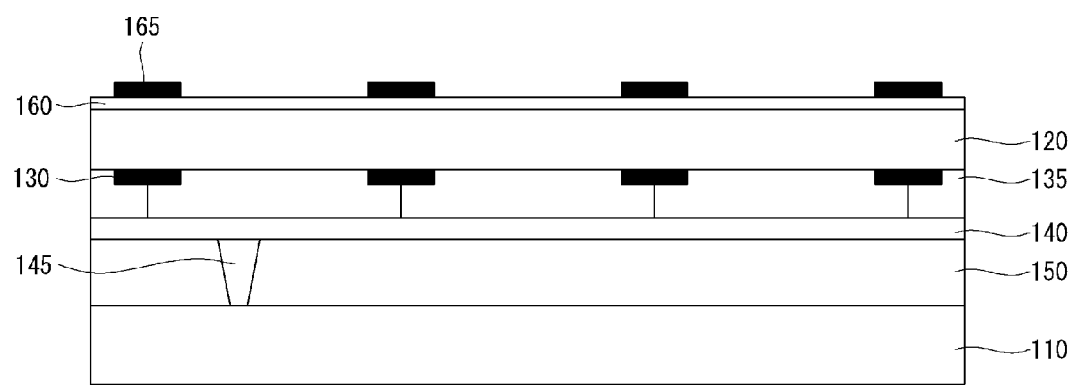

Next, referring to FIG. 25, the previously manufactured color filter substrate 120 is joined to the thin film transistor array substrate 110 to form a liquid crystal layer 150. Subsequently, first black stripes 165 are formed on the rear ITO 160 of the color filter substrate 120. The first black stripes 165 may be formed of the above-described photosensitive resin composition like the above black matrix 130. Especially, the process of forming the first black stripes 165 may be performed by a printing method. Examples of the printing method may comprise imprinting, screen printing, roll printing, and so on. By forming the first black stripes 165 in the printing method can minimize damage to the internal elements, thereby forming the first black stripes 165 after joining the substrates.

Figure 26:
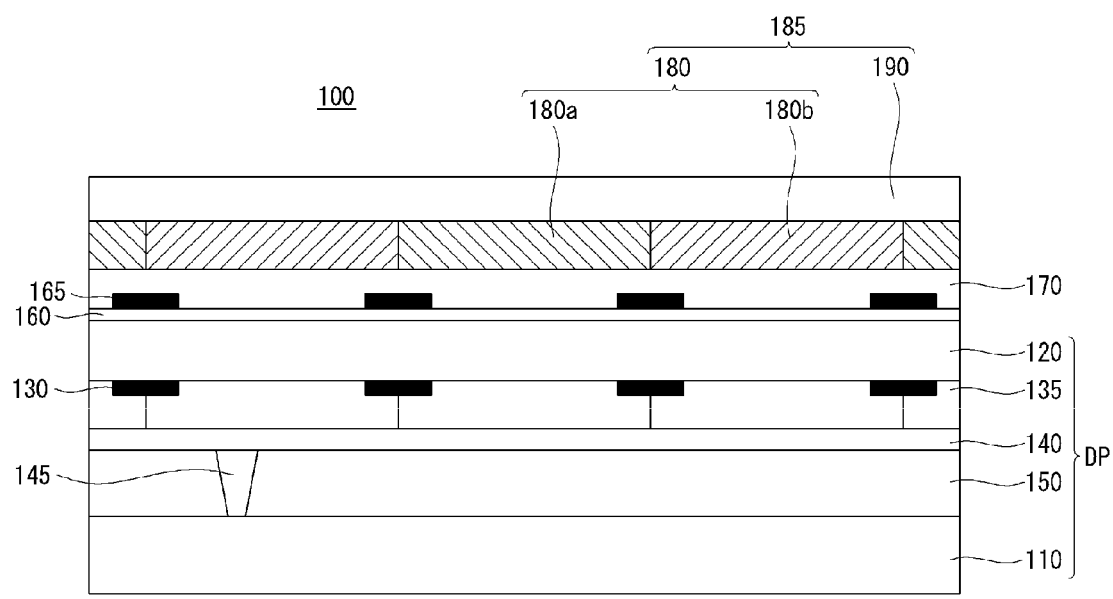

Next, referring to FIG. 26, a polarization plate 170 is attached onto the first black stripes 165 of the color filter substrate 120, and a patterned retarder film 185 is attached onto the polarization plate 170, thereby manufacturing a stereoscopic image display.

Meanwhile, the method for manufacturing a stereoscopic image display having the structure of FIG. 5 according to the first exemplary embodiment of the present invention will now be described.

Figure 27:
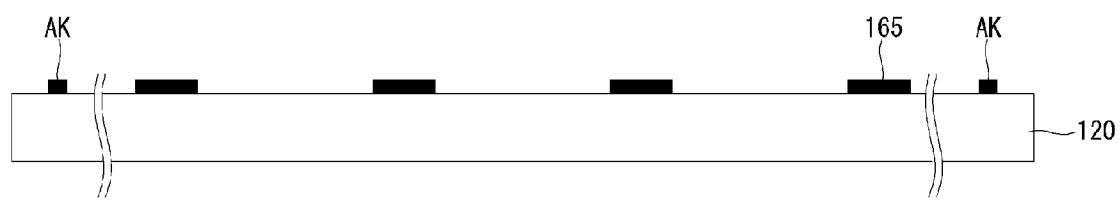
FIGS. 27 to 34 are views showing in steps a method for manufacturing a stereoscopic image display having the above-described structure of FIG. 5.

Referring to FIG. 27, first black stripes 165 and an align key AK are formed on the color filter substrate 120. The first black stripes 165 and the align key AK are formed by applying a first black stripe composition, which is the above-described photosensitive resin composition, onto the rear ITO 160 and patterning it by photolithography. Here, the align key AK is formed on a non-display area and scribed later. The first black stripes 165 correspond to the regions in which the black matrix are to be formed later, and the width of the first black stripe 165 is less than or equal to the width of the black matrix, and the area of the first black stripes 165 is less than or equal to the area of the black matrix.

Figure 28:
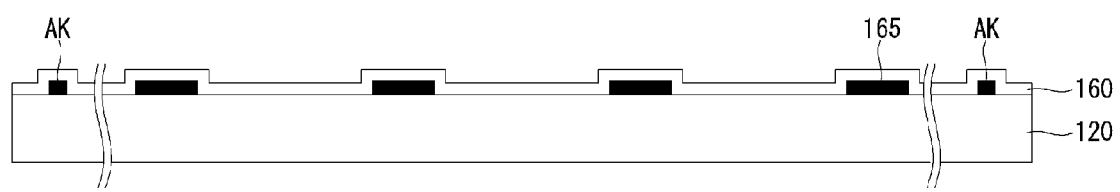

Subsequently, referring to FIG. 28, ITO is deposited on the entire surface of the color filter substrate 120 where the first black stripes 165 are formed, thereby forming the rear ITO 160. In the exemplary embodiment of the present invention, the first black stripes 165 are formed first and then a rear ITO 165 is formed, unlike the previous exemplary embodiment in which the rear ITO 160 is formed first and then the first black stripes 165 are formed.

Figure 29:
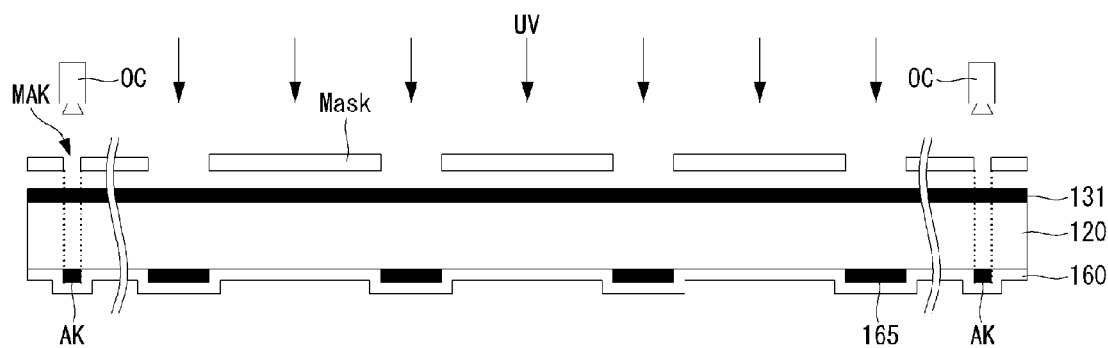
Figure 30:
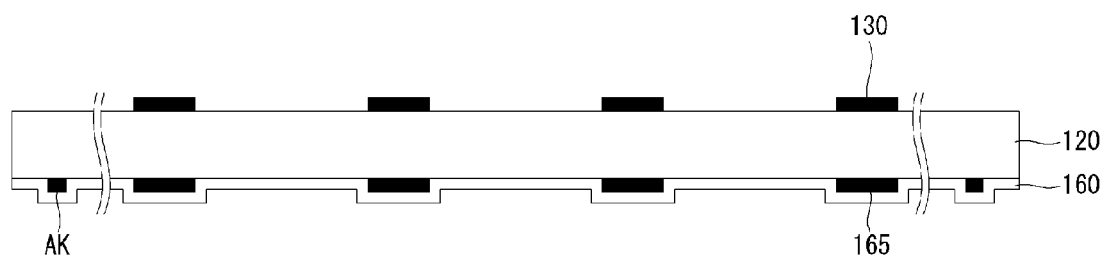

Next, referring to FIG. 29, a black matrix composition, which is the above-described photosensitive resin composition, is applied onto the other surface of the color filter substrate 120, opposite to the surface where the first black stripes 165 are formed, thereby forming a black matrix layer 131. Then, a mask for patterning the black matrix 130 is aligned. The mask may have a mask align key MAK, which can be aligned with the align key AK formed on the color filter substrate 120 through an optical camera OC. As described above, the black matrix composition of the present invention shows a transmittance of 60% or greater in the wavelength range of 800 nm or more. Accordingly, the optical camera OC may irradiate light having a wavelength range of 800 nm or more to cause the light to pass through the black matrix layer 131, and this may enable the mask align key MAK and the align key AK formed on the color filter substrate 120. Subsequently, UV light is irradiated onto the black matrix layer 131 masked by the mask and developed, thereby forming the black matrix 130 as shown in FIG. 30.

Figure 31:
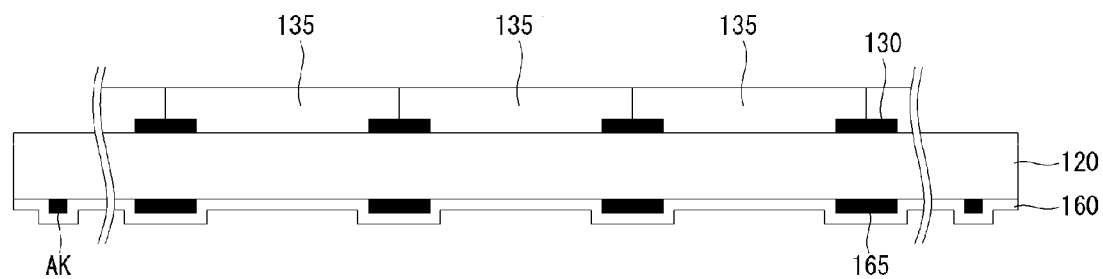
Figure 32:
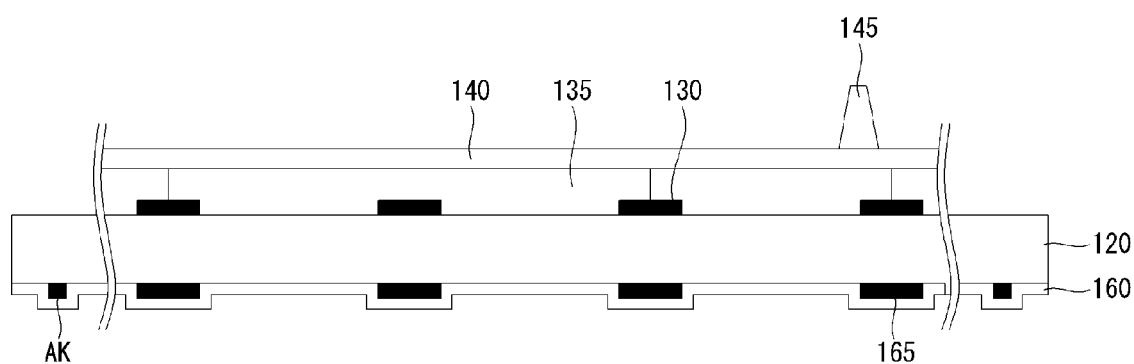
Figure 33:
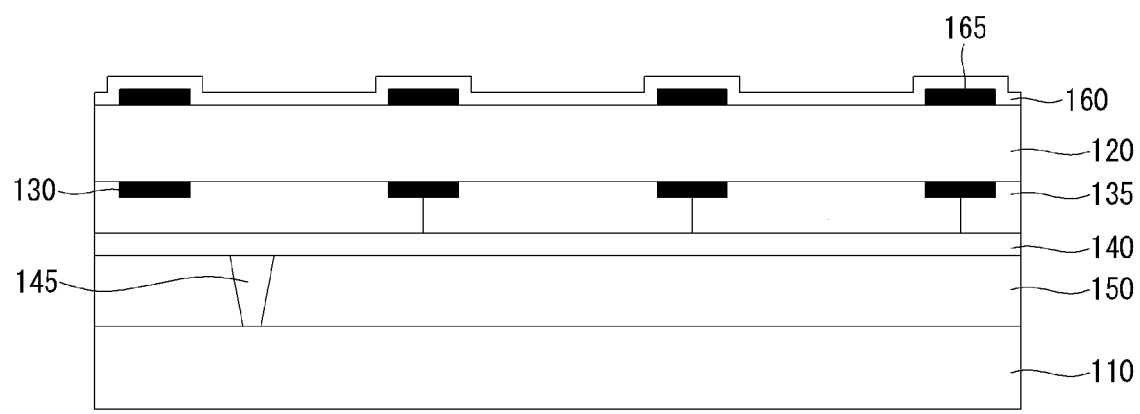

Next, referring to FIGS. 31 and 32, red, green, and blue color filters 135R, 135G, and 135B are formed on the black matrix 130, ITO is laminated on the color filters 135R, 135G, and 135B to form an overcoat layer 140, and a column spacer 145 is formed on the overcoat layer 140. Next, referring to FIG. 33, the previously manufactured color filter substrate 120 is joined to the thin film transistor array substrate 110 to form a liquid crystal layer 150. Then, the joined substrates 110 and 120 are scribed in units of cells. Hereupon, the previously formed align key AK is removed.

Figure 34:
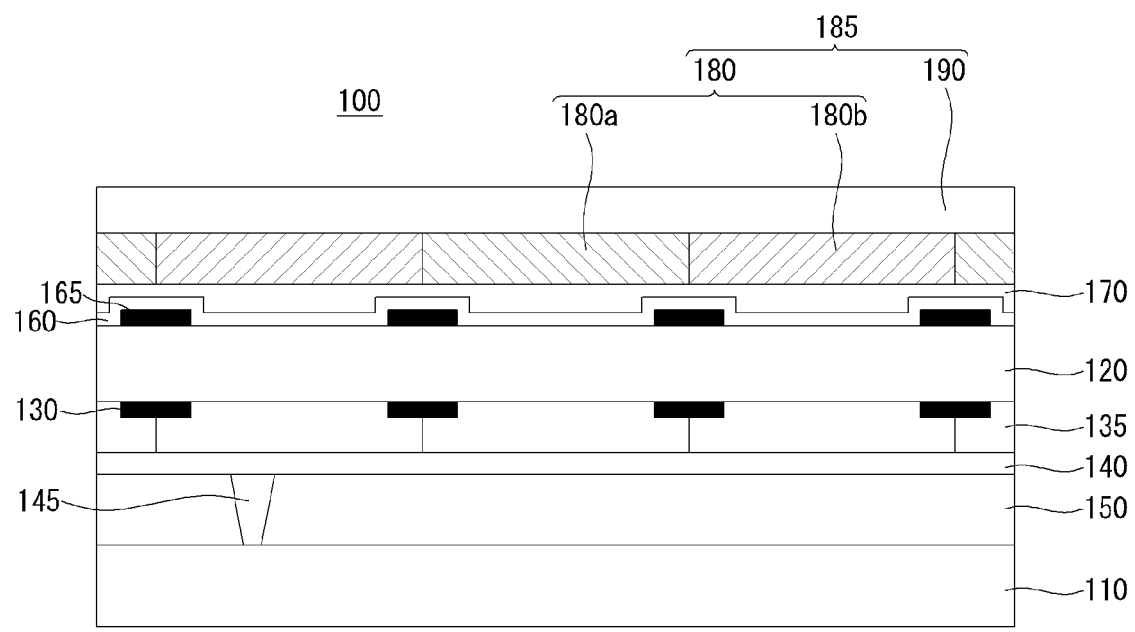

Subsequently, referring to FIG. 34, a polarization plate 170 is attached onto the first black stripes 165 of the color filter substrate 120, and a patterned retarder film 185 is attached onto the polarization plate 170, thereby manufacturing a stereoscopic image display.

As described above, the stereoscopic image display and the method for manufacturing the same according to the first exemplary embodiment of the present invention have the advantage of improving aperture ratio by a reduction in the width of black matrix and realizing a vertical viewing angle of 26 degrees by further forming first black stripes between a color filter substrate and a patterned retarder film.

Moreover, the method for manufacturing a stereoscopic image display according to the first exemplary embodiment of the present invention has the advantage of facilitating the alignment process of first black stripes and black matrix and achieving reliability because the first black stripes and the black matrix are formed of a composition having an excellent transmittance in a wavelength range of 800 nm or more.

In what follows, a stereoscopic image display and a method for manufacturing the same according to a second exemplary embodiment of the present invention will be described. In the second exemplary embodiment to be described hereinbelow, the components common to those in the above-described stereoscopic image display according to the first exemplary embodiment are denoted by like reference numerals, so the descriptions thereof will be made briefly.

Figure 35:
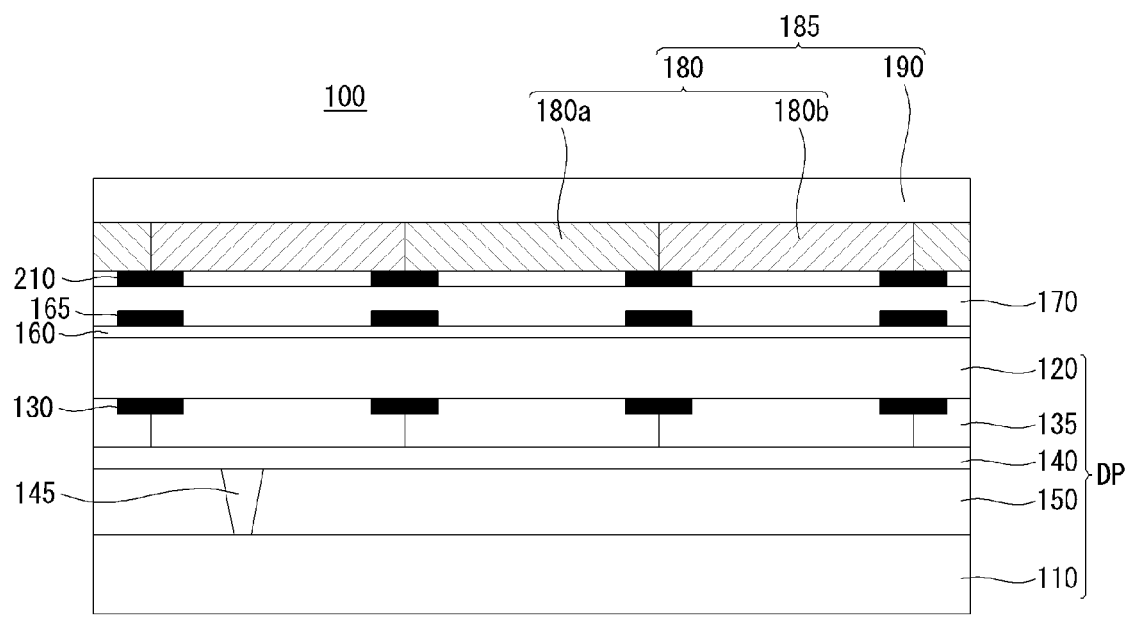
FIGS. 35 to 37 are views showing a stereoscopic image display according to a second exemplary embodiment of the present invention.
Figure 36:
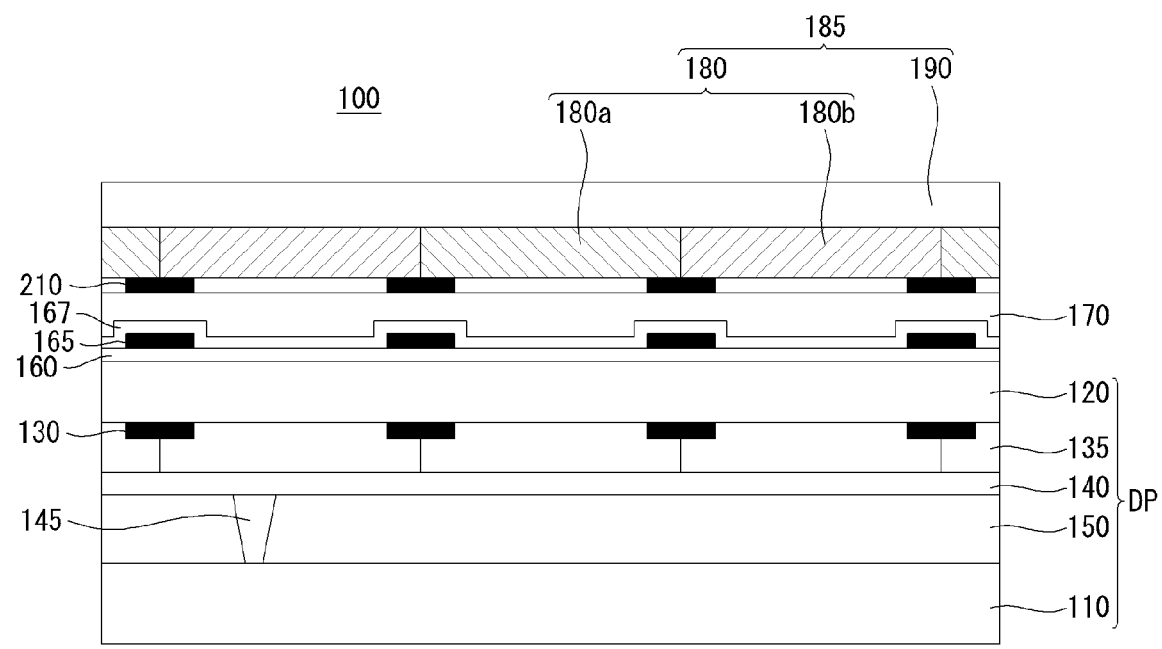
Figure 37:
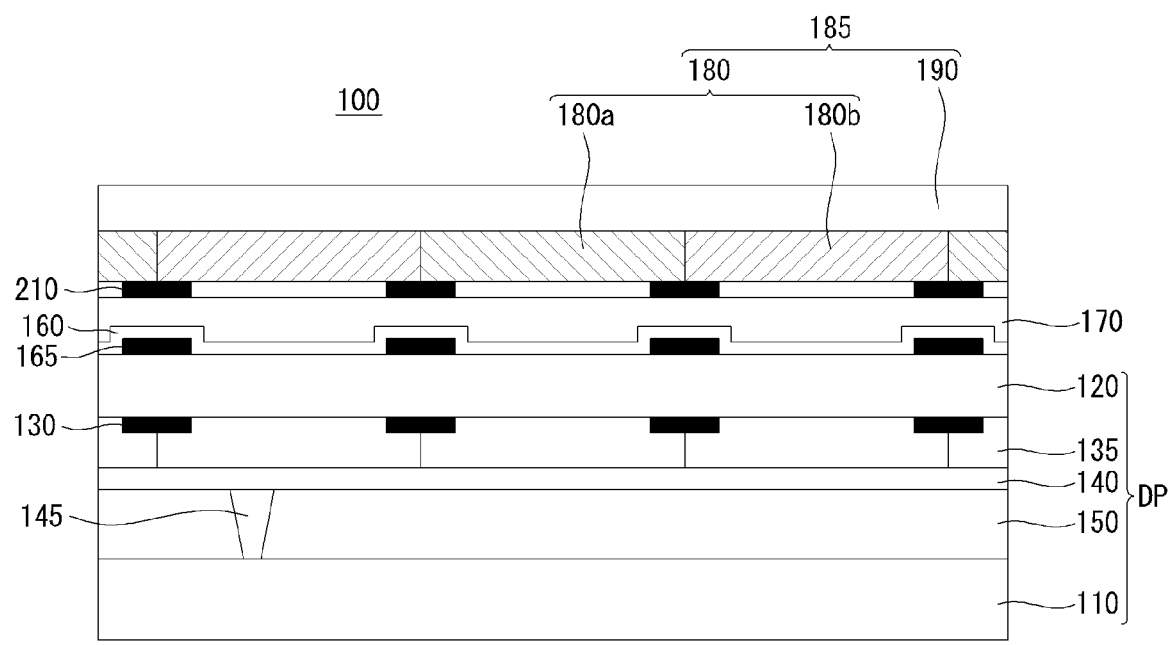
Figure 38:
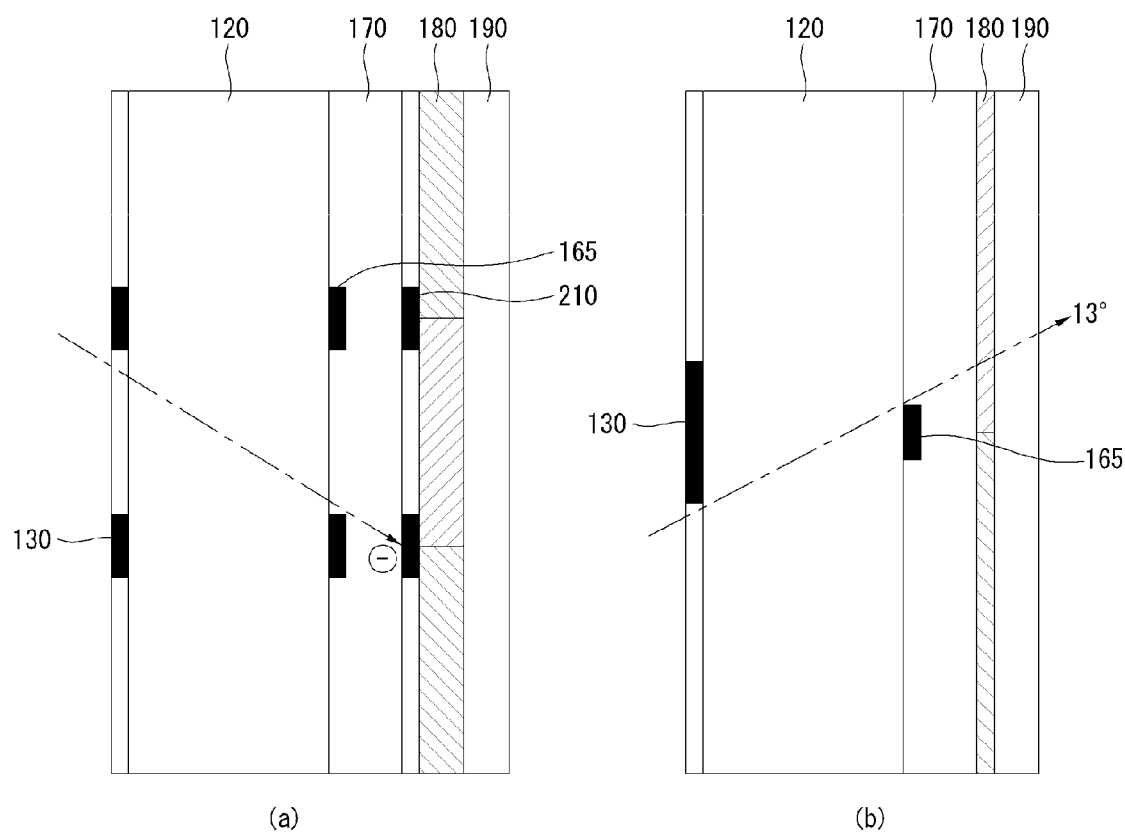
FIG. 38 is a pattern diagram showing the stereoscopic image display according to the second exemplary embodiment of the present invention.

FIGS. 35 to 37 are views showing a stereoscopic image display according to a second exemplary embodiment of the present invention, and FIG. 38 is a pattern diagram showing the stereoscopic image display according to the second exemplary embodiment of the present invention.

Referring to FIGS. 35 to 37, the stereoscopic image display 100 according to the second exemplary embodiment of the present invention further comprises second black stripes 210 formed on a polarization plate 170. More specifically, the stereoscopic image display 100 according to the second exemplary embodiment of the present invention constitutes a display panel DP comprising a thin film transistor array substrate 110, a color filter substrate 120 facing the thin film transistors array substrate 110, and a liquid crystal layer 150 interposed therebetween.

As shown in FIG. 35, on the outer surfaces of the color filter substrate 120, a rear ITO 160, first black stripes 165 formed on the rear ITO 160, the polarization plate 170 formed on the first black stripe 165, second black stripes 210 formed on the polarization plate 170, and a patterned retarder film 185 formed on the second black stripes 210 are formed.

The second black stripes 210 function to prevent crosstalk as the first black stripes 165 do. The second black stripes 210 prevent even small crosstalk. The second black stripes 210 are formed in regions corresponding to the black matrix 130 and the first black stripes 165. Here, in order to prevent lowering of the aperture ratio of the display, the width of the second black stripes 210 is less than or equal to the width of the black matrix 130, and the area of the second black stripes 210 is less than or equal to the area of the black matrix 130 within the regions corresponding to the black matrix 130. Moreover, the second black stripes 210 are made of the photosensitive resin composition containing carbon black, which is the same material used for the above-described black matrix 130 and first black stripes 165.

Further, as shown in FIG. 36, the stereoscopic image display according to the second exemplary embodiment of the present invention may comprise a rear ITO 160 formed on the outer surface of the color filter substrate 210, first black stripes 165 formed on the rear ITO 160, an adhesive 167 formed on the first black stripes 165, a polarization plate 170 formed on the rear ITO 160 by the adhesive 167, second black stripes 210 formed on the polarization plate 170, and a patterned retarder film 185 formed on the second black stripe 210.

Further, as shown in FIG. 36, the stereoscopic image display according to the second exemplary embodiment of the present invention may comprise first black stripes 165 formed on the outer surface of the color filter substrate 210, a rear ITO 160 formed on the first black stripes 165, a polarization plate 170 formed on the rear ITO 160, second black stripes 210 formed on the polarization plate 170, and a patterned retarder film 185 formed on the second black stripe 210.

Referring to FIG. 38, the stereoscopic image display according to the second exemplary embodiment of the present invention comprises the first black stripes 165 and the second black stripes 210. Hence, the light indicated by ①, which is not blocked by the first black stripes 165, is blocked by the second black stripes 210, thereby preventing crosstalk.

Therefore, the stereoscopic image display according to the second exemplary embodiment of the present invention has the advantage of further increasing a vertical viewing angle while preventing crosstalk by further forming the second black stripes in addition to the first black stripes.

Hereinafter, a method for manufacturing a stereoscopic image display according to the second exemplary embodiment of the present invention will be described. Since the stereoscopic image display device according to the second exemplary embodiment of the present invention has a structure in which the second black stripes are further formed on the polarization plate of the above-described stereoscopic image display according to the first exemplary embodiment, the manufacturing method of the second exemplary embodiment is different from the manufacturing method of the first exemplary embodiment in that the process of forming the second black stripes is added. Accordingly, the method for manufacturing a stereoscopic image display having the structure of FIG. 35 will be described below, and a description of the method for manufacturing a stereoscopic image display having the structure of FIGS. 36 and 37 will be omitted because the manufacturing method of the second black stripes to be described below can be applied as it is.

FIGS. 39 to 47 are views showing in steps a method for manufacturing the stereoscopic image display shown in FIG. 35 according to the second exemplary embodiment of the present invention.

Figure 39:
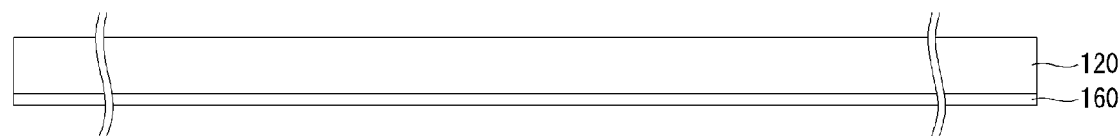
FIGS. 39 to 47 are views showing in steps a method for manufacturing the stereoscopic image display shown in FIG. 35 according to the second exemplary embodiment of the present invention.
Figure 40:

Referring to FIG. 39, ITO is deposited on an entire surface of a color filter substrate 120 to form a rear ITO 160. Referring to FIG. 40, first black stripes 165 and an align key AK are formed on the rear ITO 160. The first black stripes 165 and the align key AK are formed by applying a first black stripe composition, which is the above-described photosensitive resin composition, onto the rear ITO 160 and patterning it by photolithography. Here, the align key AK is formed on a non-display area and scribed later. The first black stripes 165 correspond to the regions in which the black matrix are to be formed later, and the width of the first black stripes 165 is less than or equal to the width of the black matrix, and the area of the first black stripes 165 is less than or equal to the area of the black matrix.

Figure 41:
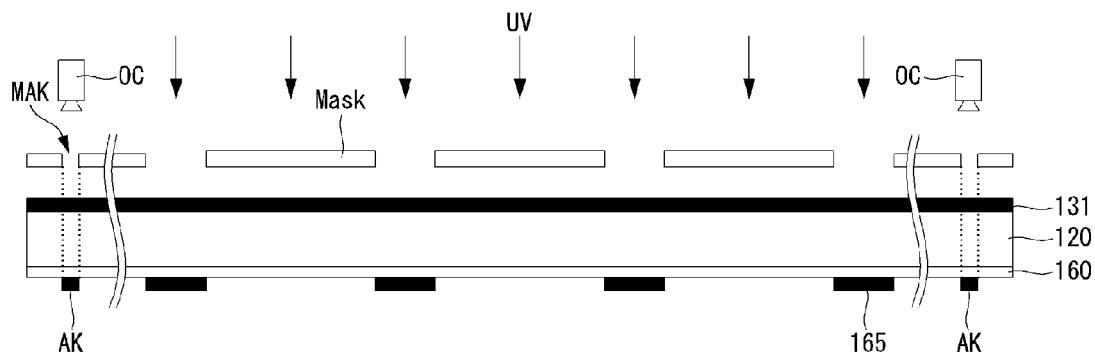

Next, referring to FIG. 41, a black matrix composition, which is the above-described photosensitive resin composition, is applied onto the other surface of the color filter substrate 120, opposite to the surface where the first black stripes 165 are formed, thereby forming a black matrix layer 131. Then, a mask for patterning the black matrix 130 is aligned. The mask may have a mask align key MAK, which can be aligned with the align key AK formed on the color filter substrate 120 through an optical camera OC. As described above, the black matrix composition of the present invention shows a transmittance of 60% or greater in the wavelength range of 800 nm or more. Accordingly, the optical camera OC may irradiate light having a wavelength range of 800 nm or more to cause the light to pass through the black matrix layer 131, and this may enable the mask align key MAK and the align key AK formed on the color filter substrate 120.

Figure 42:
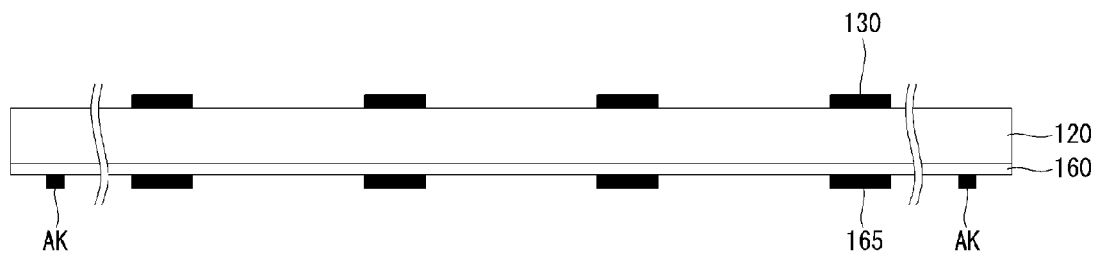

Subsequently, UV light is irradiated onto the black matrix layer 131 masked by the mask and developed, thereby forming the black matrix 130 as shown in FIG. 42.

Figure 43:
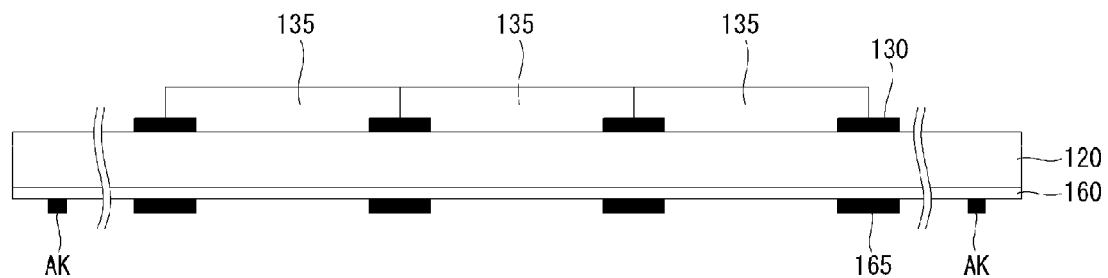
Figure 44:
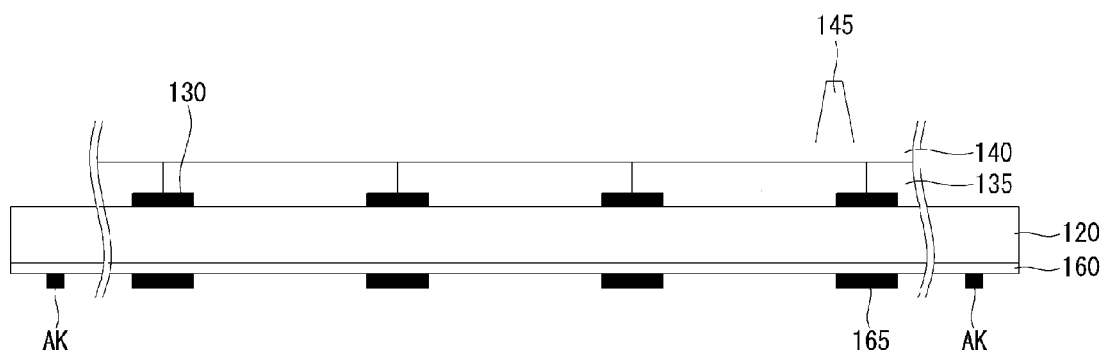
Figure 45:
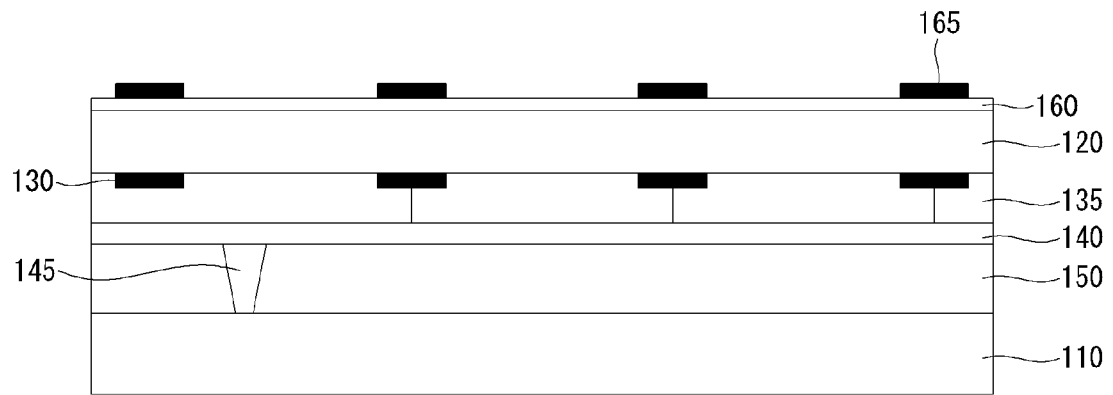

Next, referring to FIGS. 43 and 44, red, green, and blue color filters 135R, 135G, and 135B are formed on the black matrix 130, ITO is laminated on the color filters 135R, 135G, and 135B to form an overcoat layer 140, and a column spacer 145 is formed on the overcoat layer 140. Next, referring to FIG. 45, the previously manufactured color filter substrate 120 is joined to the thin film transistor array substrate 110 to form a liquid crystal layer 150. Then, the joined substrates 110 and 120 are scribed in units of cells. Hereupon, the previously formed align key AK is removed.

Figure 46:
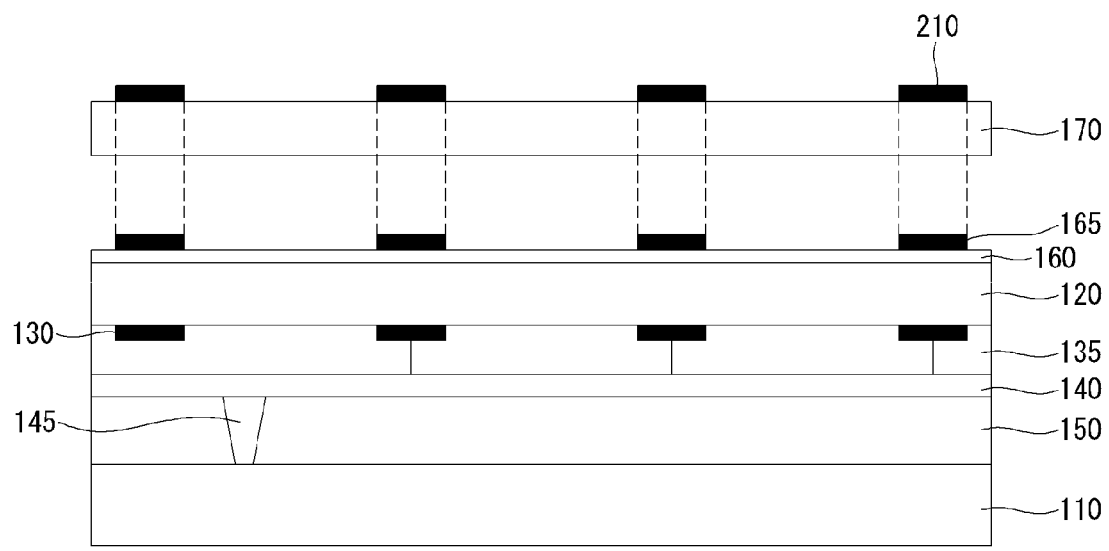
Figure 47:
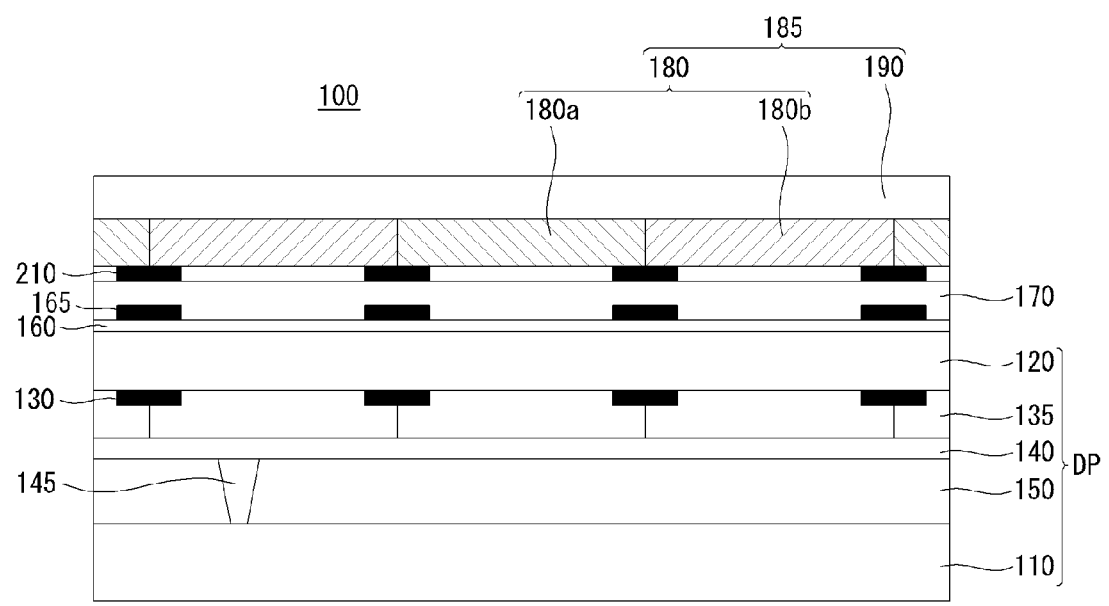

Subsequently, referring to FIG. 46, a polarization plate 170 is prepared, and second black stripes 210 are formed on the polarization plate 170. At this point, the second black stripes 210 are formed to have design values equal to or below the design values of the above-described black matrix 130 or first black stripes 165. The polarization plate 170 with the second black stripes 210 formed thereon is aligned on the color filter substrate 120 where the first black stripes 165 are formed. At this point, each of the first black stripes 165 is regarded as an align key, and the pattern of the second black stripes 210 formed on the polarization plate 170 is aligned and attached.

Subsequently, referring to FIG. 46, a patterned retarder film 185 with a protective film 190 attached thereon is attached onto the second black stripes 165, thereby manufacturing a stereoscopic image display.

In what follows, a stereoscopic image display and a method for manufacturing the same according to a third exemplary embodiment of the present invention will be described. In the third exemplary embodiment to be described hereinbelow, the components common to those in the above-described stereoscopic image display according to the first and second exemplary embodiments are denoted by like reference numerals, so the descriptions thereof will be made briefly.

Figure 48:
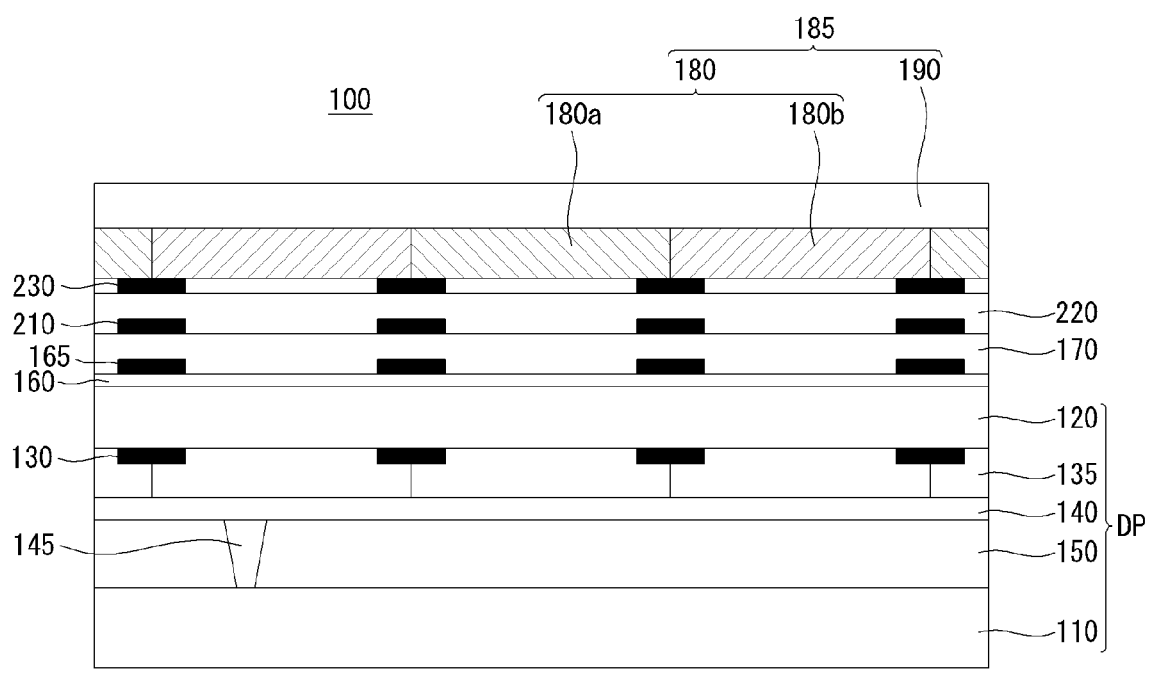
FIGS. 48 to 50 are views showing a stereoscopic image display according to a third exemplary embodiment of the present invention.
Figure 49:
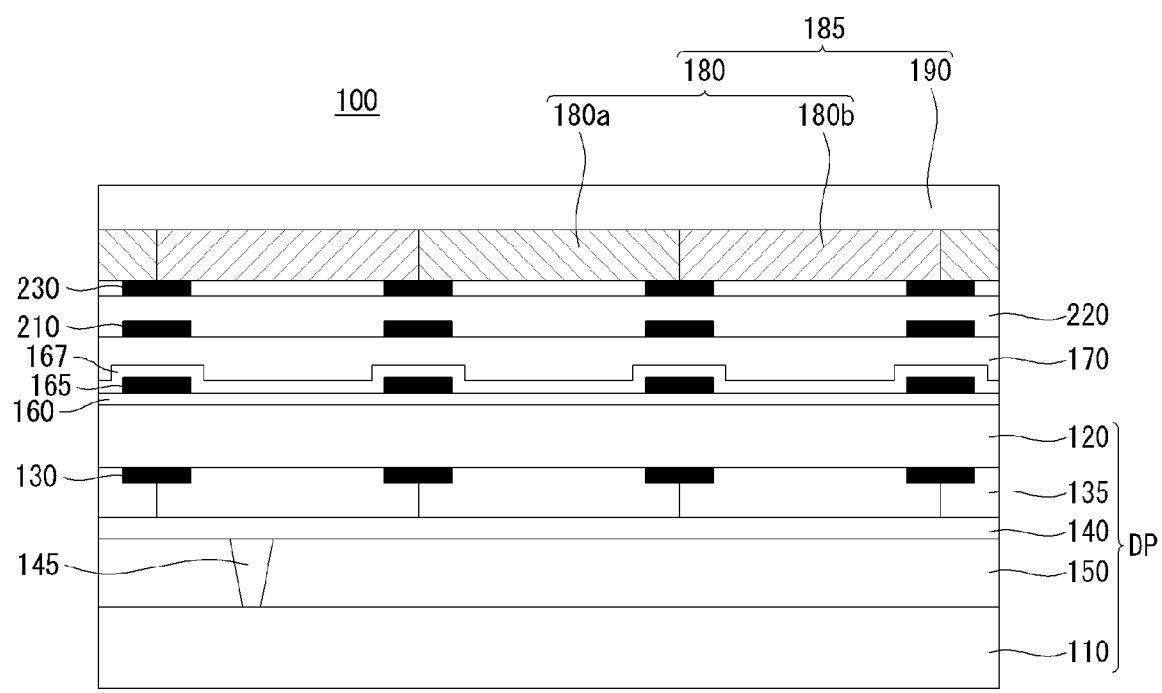
Figure 50:
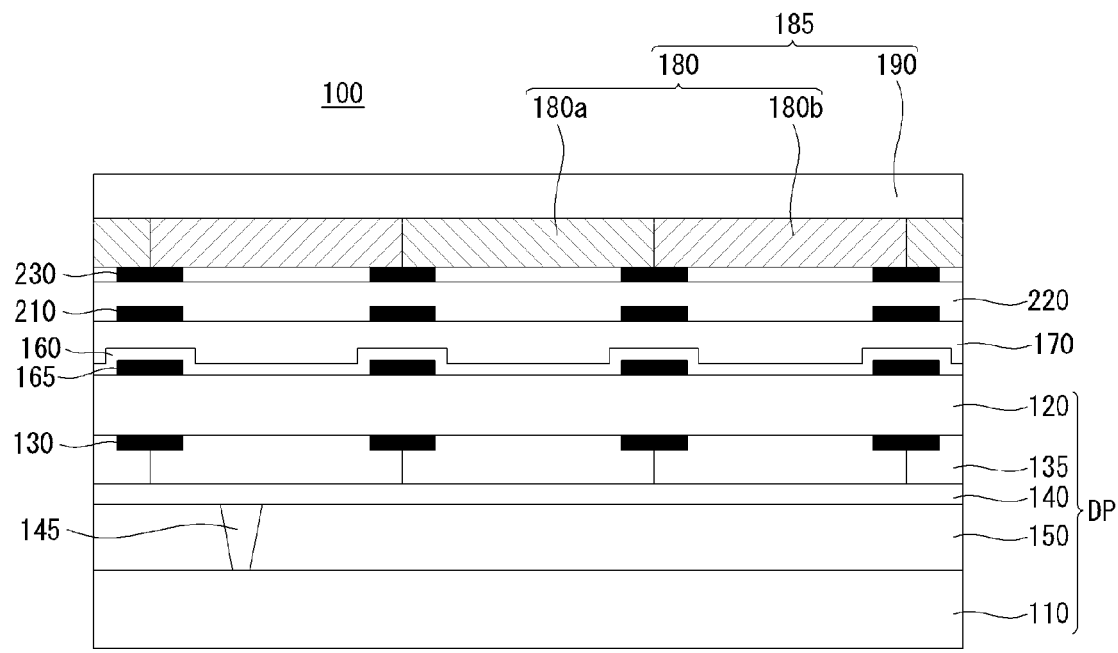

FIGS. 48 to 50 are views showing a stereoscopic image display according to a third exemplary embodiment of the present invention.

Referring to FIGS. 48 and 50, the stereoscopic image display 100 according to the third exemplary embodiment of the present invention further comprises a TAC film 220 and third black stripes 230 formed on the second black stripes 210, in addition to the stereoscopic image display according to the second exemplary embodiment of the present invention. More specifically, the stereoscopic image display according to the third exemplary embodiment of the present invention constitutes a display panel DP comprising a thin film transistor array substrate 110, a color filter substrate 120 facing the thin film transistors array substrate 110, and a liquid crystal layer 150 interposed therebetween.

As shown in FIG. 48, on the outer surfaces of the color filter substrate 120, a rear ITO 160, first black stripes 165 formed on the rear ITO 160, the polarization plate 170 formed on the first black stripe 165, second black stripes 210 formed on the polarization plate 170, a TAC film 220 formed on the second black stripes 210, third black stripes 230 formed on the TAC film 220, and a patterned retarder film 185 formed on the third black stripes 210 are formed.

The third black stripes 230 function to prevent crosstalk as the first black stripes 165 and the second black stripes 210 do. The second black stripes 210 prevent even small crosstalk. The third black stripes 230 are formed in regions corresponding to the black matrix 130, the first black stripes 165, and the second black stripes 210. Here, in order to prevent lowering of the aperture ratio of the display, the width of the third black stripes 230 is less than or equal to the width of the black matrix 130, and the area of the third black stripes 230 is less than or equal to the area of the black matrix 130 within the regions corresponding to the black matrix 130. Moreover, the third black stripes 230 are made of the photosensitive resin composition containing carbon black, which is the same material used for the above-described black matrix 130, first black stripes 165, and second black stripes 210.

Further, as shown in FIG. 49, the stereoscopic image display according to the third exemplary embodiment of the present invention may comprise a rear ITO 160 formed on the outer surface of the color filter substrate 210, first black stripes 165 formed on the rear ITO 160, an adhesive 167 formed on the first black stripes 165, a polarization plate 170 formed on the rear ITO 160 by the adhesive 167, second black stripes 210 formed on the polarization plate 170, a TAC film 220 formed on the second black stripes 210, third black stripes 230 formed on the TAC film 220, and a patterned retarder film 185 formed on the third black stripes 230.

Further, as shown in FIG. 50, the stereoscopic image display according to the third exemplary embodiment of the present invention may comprise first black stripes 165 formed on the outer surface of the color filter substrate 210, a rear ITO 160 formed on the first black stripes 165, a polarization plate 170 formed on the rear ITO 160, second black stripes 210 formed on the polarization plate 170, a TAC film 220 formed on the second black stripes 210, third black stripes 230 formed on the TAC film 220, and a patterned retarder film 185 formed on the third black stripe 230.

The stereoscopic image display according to the third exemplary embodiment of the present invention has the advantage of further increasing a vertical viewing angle while preventing crosstalk by further forming the third black stripes in addition to the first black stripes and the second black stripes.

Hereinafter, a method for manufacturing a stereoscopic image display according to the third exemplary embodiment of the present invention will be described. Since the stereoscopic image display device according to the third exemplary embodiment of the present invention has a structure in which the third black stripes are further formed on the polarization plate of the above-described stereoscopic image display according to the second exemplary embodiment, the manufacturing method of the third exemplary embodiment is different from the manufacturing method of the second exemplary embodiment in that the process of forming the third black stripes is added. Accordingly, the method for manufacturing a stereoscopic image display having the structure of FIG. 50 will be described below, and a description of the method for manufacturing a stereoscopic image display having the structure of FIGS. 48 and 49 will be omitted because the manufacturing method of the third black stripes to be described below can be applied as it is.

FIGS. 51 to 60 are views showing in steps a method for manufacturing the stereoscopic image display shown in FIG. 50 according to the third exemplary embodiment of the present invention.

Figure 51:
FIGS. 51 to 60 are views showing in steps a method for manufacturing the stereoscopic image display shown in FIG. 50 according to the third exemplary embodiment of the present invention.
Figure 52:
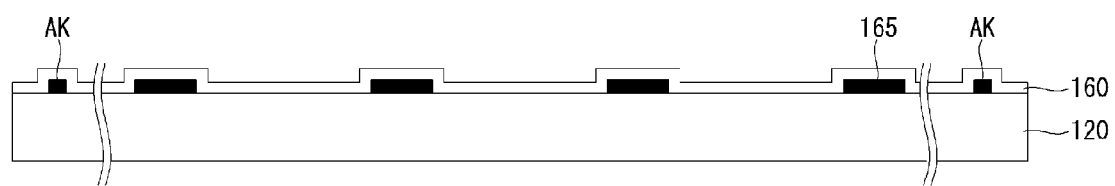

Referring to FIG. 51, first black stripes 165 and an align key AK are formed on the color filter substrate 120. The first black stripes 165 and the align key AK are formed by applying a first black stripe composition, which is the above-described photosensitive resin composition, onto the rear ITO 160 and patterning it by photolithography. Here, the align key AK is formed on a non-display area and scribed later. The first black stripes 165 correspond to the regions in which the black matrix are to be formed later, and the width of the first black stripes 165 is less than or equal to the width of the black matrix and the area of the first black stripes 165 is less than or equal to the area of the black matrix. Subsequently, referring to FIG. 52, ITO is deposited on the entire surface of the color filter substrate 120 where the first black stripes 165 are formed, thereby forming the rear ITO 160.

Figure 53:
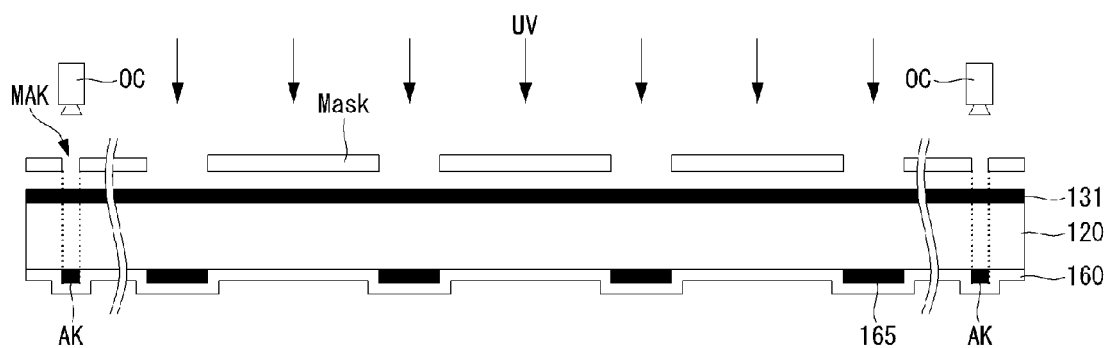
Figure 54:
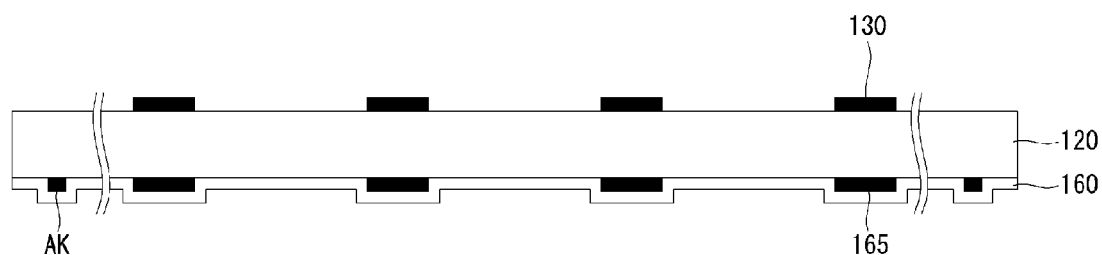

Next, referring to FIG. 53, a black matrix composition, which is the above-described photosensitive resin composition, is applied onto the other surface of the color filter substrate 120, opposite to the surface where the first black stripes 165 are formed, thereby forming a black matrix layer 131. Then, a mask for patterning the black matrix 130 is aligned. The mask may have a mask align key MAK, which can be aligned with the align key AK formed on the color filter substrate 120 through an optical camera OC. As described above, the black matrix composition of the present invention shows a transmittance of 60% or greater in the wavelength range of 800 nm or more. Accordingly, the optical camera OC may irradiate light having a wavelength range of 800 nm or more to cause the light to pass through the black matrix layer 131, and this may enable the mask align key MAK and the align key AK formed on the color filter substrate 120. Subsequently, UV light is irradiated onto the black matrix layer 131 masked by the mask and developed, thereby forming the black matrix 130 as shown in FIG. 54.

Figure 55:
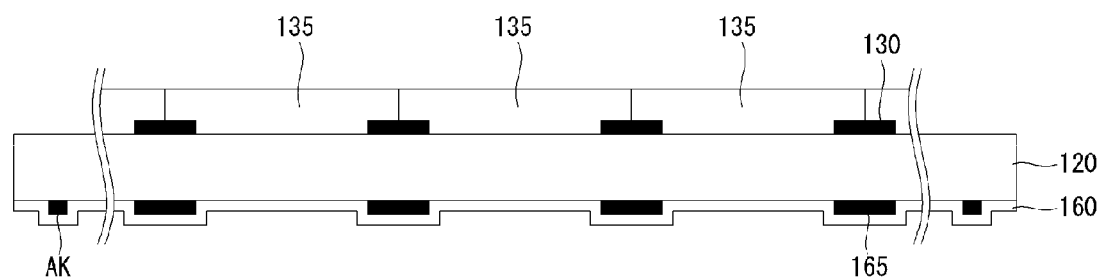
Figure 56:
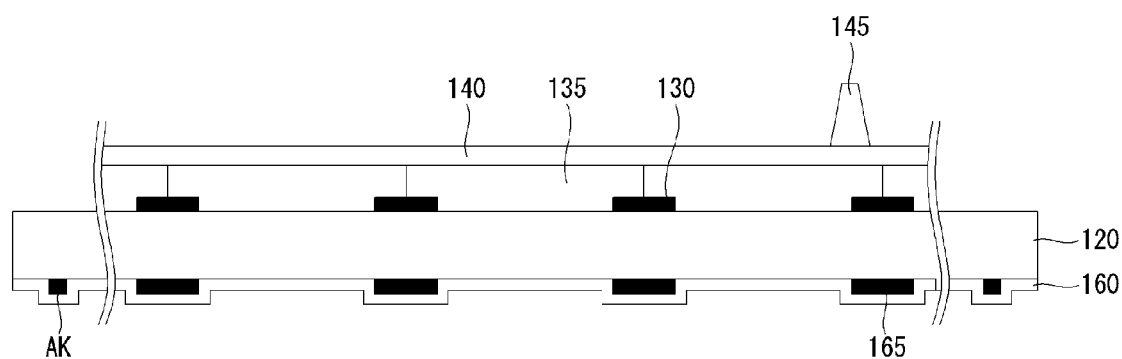
Figure 57:
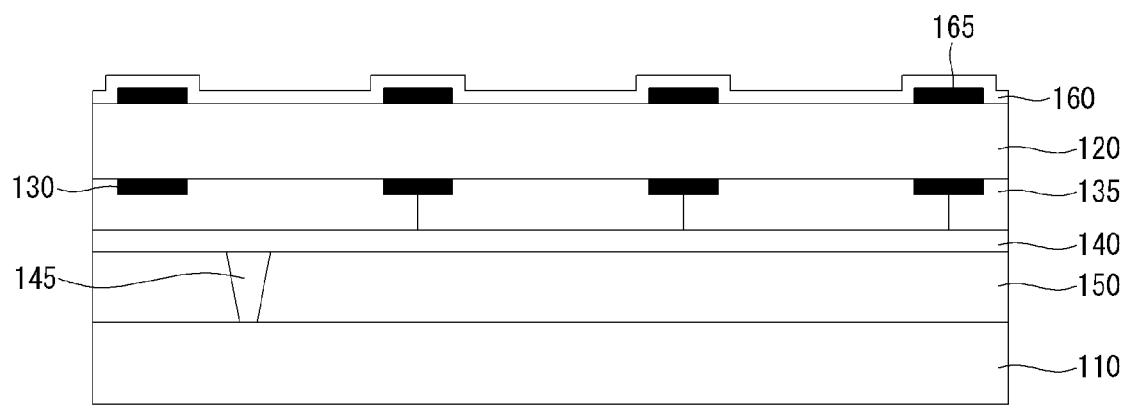

Next, referring to FIGS. 55 and 56, red, green, and blue color filters 135R, 135G, and 135B are formed on the black matrix 130, ITO is laminated on the color filters 135R, 135G, and 135B to form an overcoat layer 140, and a column spacer 145 is formed on the overcoat layer 140. Next, referring to FIG. 57, the previously manufactured color filter substrate 120 is joined to the thin film transistor array substrate 110 to form a liquid crystal layer 150. Then, the joined substrates 110 and 120 are scribed in units of cells. Hereupon, the previously formed align key AK is removed.

Figure 58:
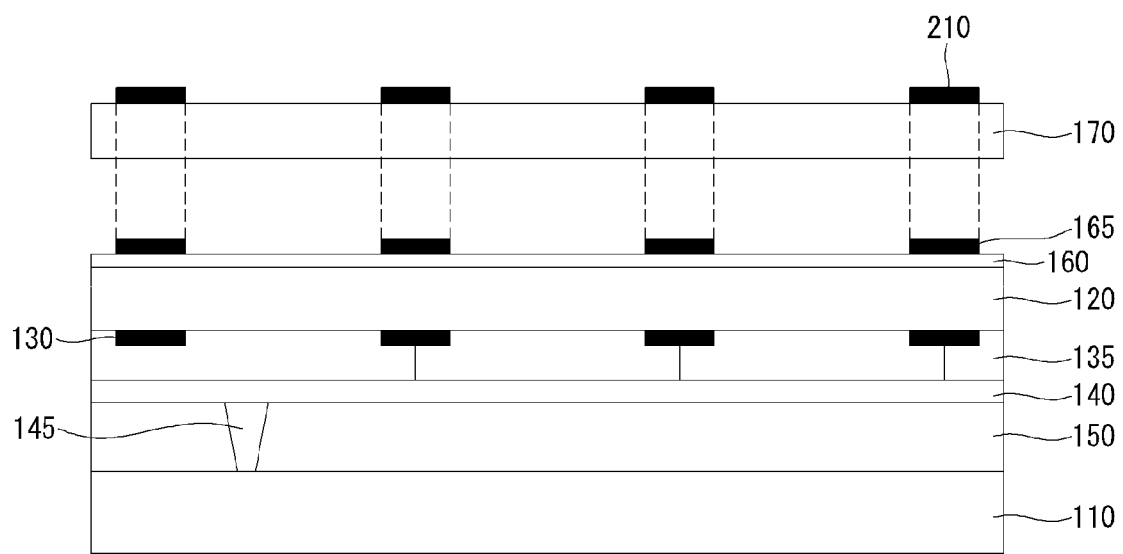

Subsequently, referring to FIG. 58, a polarization plate 170 is prepared, and second black stripes 210 are formed on the polarization plate 170. At this point, the second black stripes 210 are formed to have design values equal to or below the design values of the above-described black matrix 130 or first black stripes 165. The polarization plate 170 with the second black stripes 210 formed thereon is aligned on the color filter substrate 120 where the first black stripes 165 are formed. At this point, each of the first black stripes 165 is regarded as an align key, and the pattern of the second black stripes 210 formed on the polarization plate 170 is aligned and attached.

Figure 59:
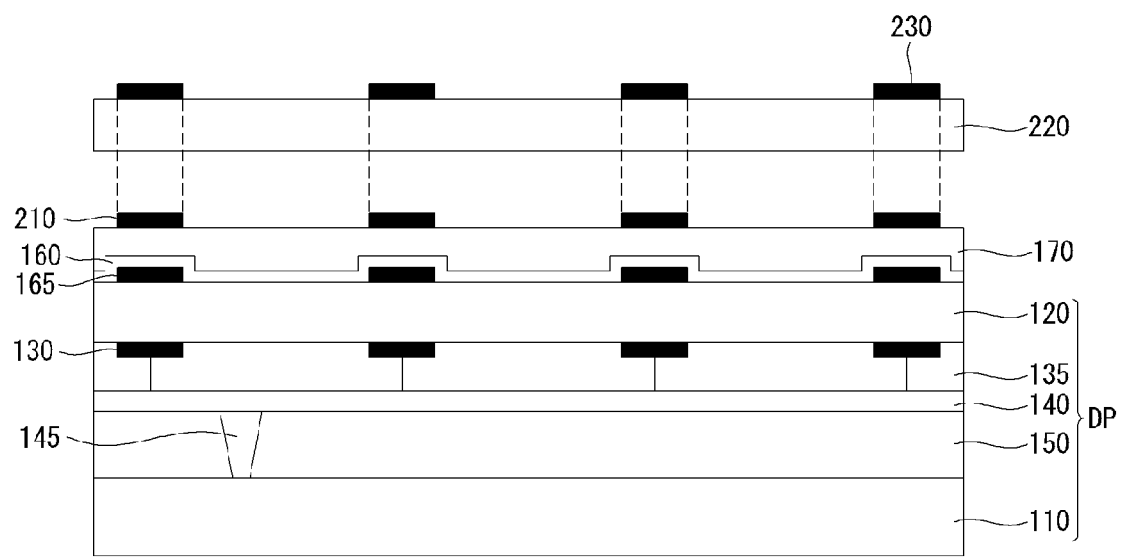
Figure 60:
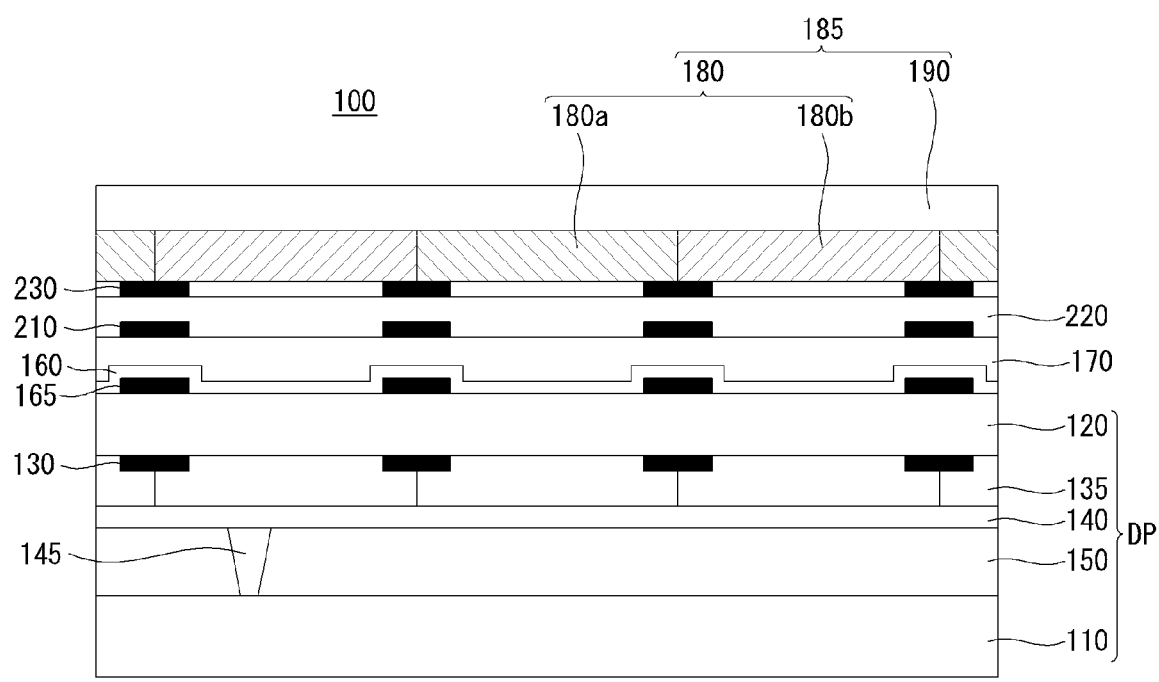

Next, referring to FIG. 59, a TAC film 220 is prepared, and third black stripes 230 are formed on the TAC film 220. At this point, the third black stripes 230 are formed to have design values equal to or below the design values of the above-described black matrix 130. The TAC film 220 with the third black stripes 230 formed thereon is aligned on the color filter substrate 120 where the second black stripes 210 are formed. At this point, each of the second black stripes 210 is regarded as an align key, and the pattern of the third black stripes 230 formed on the TAC film 220 is aligned and attached Finally, referring to FIG. 60, a patterned retarder film 185 with a protective film 190 attached thereon is attached onto the third black stripes 230, thereby manufacturing a stereoscopic image display.

Hereinafter, a stereoscopic image display according to the present invention will be described in detail in the following test examples. However, the following test examples are merely intended to illustrate the present invention, and the present invention is not limited to the following test examples.

Test Example 1

Figure 1:
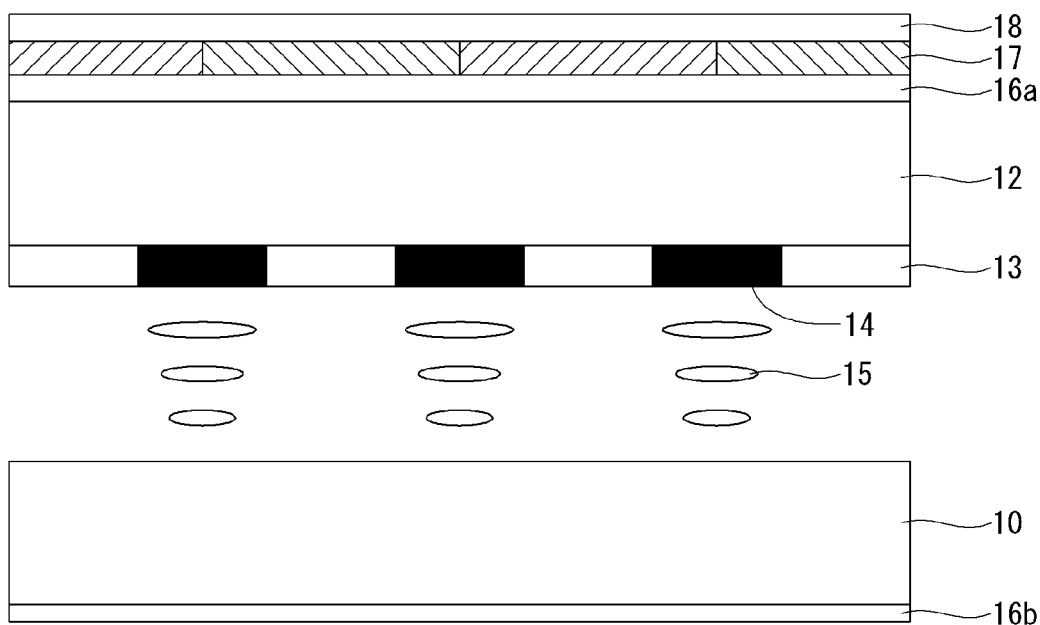
FIG. 1 is a view showing a related art stereoscopic image display.

The aperture ratio relative to the width of black matrix of the stereoscopic image display of the present invention shown in FIG. 3 and the related art stereoscopic image display shown in FIG. 1 was measured and shown in the following Table 1.

TABLE 1

|  | 47-inch display of the related art | 47-inch display of the present invention |
|---|---|---|
| 3D vertical viewing angle (°) | 26 | 26 |
| Presence of black stripes | No | Yes |
| Width of black matrix (μm) | 240 | 90 |
| Aperture ratio (%) | 38 | 55 |

Referring to Table 1, it can be seen that the stereoscopic image display having the black stripes of the present invention showed around 17% or more improvement in aperture ratio, as compared to the related art stereoscopic image display.

Test Example 2

The vertical viewing angle relative to the width of black matrix, first black stripes, and second black stripes and the presence or absence thereof was measured according to conditions and shown in the following Table 2. In Table 2, a width of 0 indicates the absence of the corresponding components (e.g., the width of the first black stripes and the width of the second black stripes are represented by 0 under the condition 1, this indicates that not the first black stripes and the second black stripes but only the black matrix are formed in the stereoscopic image display under the condition 1.

TABLE 2

| # | Width of black matrix (μm) | Width of first black stripes (μm) | Width of second black stripes (μm) | Vertical viewing angle (°) (condition of crosstalk of 10%) |
|---|---|---|---|---|
| Condition 1 | 65 | 0 | 0 | 12.43 |
| Condition 2 | 65 | 20 | 0 | 16.53 |
| Condition 3 | 65 | 20 | 10 | 17.57 |
| Condition 4 | 65 | 20 | 20 | 18.60 |

Referring to Table 2, it was observed that condition 2 provided with the first black stripes showed an around 3.9% increase in vertical viewing angle as compared to the condition 1 with the black matrix alone. Moreover, it was observed that the conditions 3 and 4 further provided with the second black stripes showed a further increase in vertical viewing angle as compared to the condition 2. Especially, when comparing the conditions 3 and 4, it was observed that the condition 4 with a larger width of the second black stripes showed a further increase in vertical viewing angle, compared to the condition 3.

Test Example 3

A stereoscopic image display comprising only black matrix having a transmittance of 0% was manufactured in a comparative example, whereas a stereoscopic image display comprising black matrix having a transmittance of 0% and first black stripes was manufactured in an exemplary embodiment. The vertical viewing angle of the stereoscopic image display was measured while adjusting the transmittance of the first black stripes to 10%, 20%, 30%, 50%, and 100%, and shown in the following Table 3 and FIG. 61.

TABLE 3

|  | Transmittance of first black stripes (%) | | | | |
|---|---|---|---|---|---|
|  | 10 | 20 | 30 | 50 | 100 |
| Vertical viewing angle of exemplary embodiment (°) | 14.7754 | 14.2393 | 13.7063 | 12.8863 | 11.0395 |
| Vertical viewing angle of exemplary embodiment (°) | | | 11.0395 | | |

Figure 61:
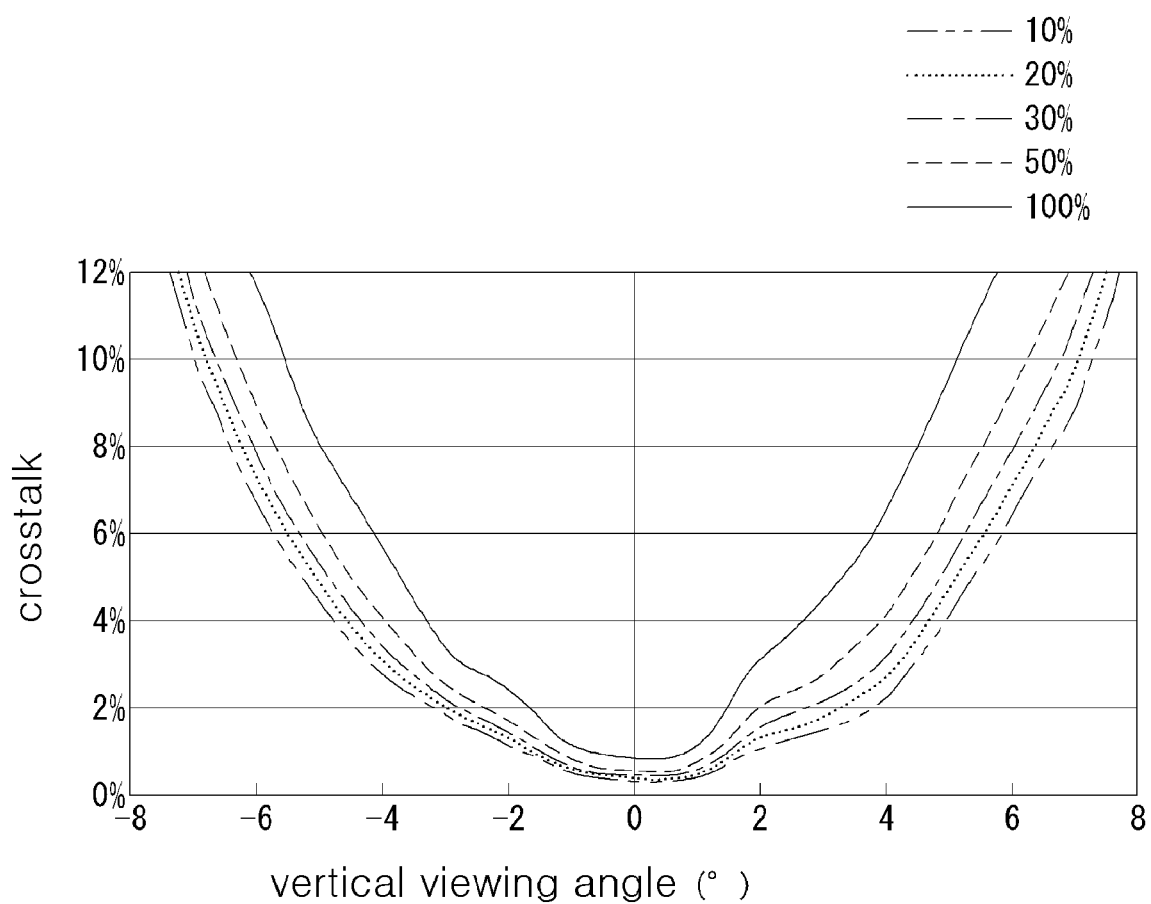
FIG. 61 is a graph showing the vertical viewing angle relative to the transmittance of first black stripes.

Referring to Table 3 and FIG. 61, it was found that the lower the transmittance of the first black stripes, the greater the vertical viewing angle of the stereoscopic image display. Through Test Example 3, the transmittance of the first black stripes can be appropriately adjusted, thereby facilitating the alignment process of the first black stripes and the black matrix and improving the vertical viewing angle.

As seen from above, the stereoscopic image displays according to the exemplary embodiments of the present invention have the advantage of improving aperture ratio by a reduction in the width of black matrix by further forming a plurality of black stripes in addition to the black matrix. Moreover, they have the advantage of improving the vertical viewing angle of the stereoscopic image display and reducing crosstalk.

Additionally, the methods for manufacturing a stereoscopic image display according to the exemplary embodiments of the present invention have the advantage of achieving the reliability of the alignment process between black matrix and black stripes and facilitating the alignment process because the black stripes are formed of a material having a high transmittance. Accordingly, it is possible to prevent crosstalk that may be generated by misalignment between the black matrix and the black stripes.

While the present invention has been described in detail in connection with certain exemplary embodiments thereof, the embodiments are simply for the purpose of illustration. It will be understood by those skilled in the art that the present invention may be implemented in a different specific form without changing the technical spirit or essential characteristics thereof. Therefore, embodiments and examples disclosed herein should be construed as being illustrative but not restrictive in all aspects. The scope of the invention is shown not by the above description but by claims and it is intended to include all changes which fall within meanings and scopes equivalent to claims.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6).

What is claimed is:

1. A stereoscopic image display comprising:
a thin film transistor array substrate;
a color filter substrate facing the thin film transistor array substrate, and comprising black matrix;
first black stripes formed on the color filter substrate, and formed at positions corresponding to the black matrix;
a patterned retarder film formed on the first black stripes; and
second black stripes formed between the first black stripes and the patterned retarder film.

2. The stereoscopic image display of claim 1, further comprising third black stripes formed between the second black stripes and the pattered retarder film.

3. The stereoscopic image display of claim 2, further comprising a first adhesive layer formed between the first black stripes and the patterned retarder film.

4. The stereoscopic image display of claim 3, further comprising a polarization plate formed between the patterned retarder film and the first adhesive layer.

5. The stereoscopic image display of claim 4, wherein the second black stripes are formed between the polarization plate and the patterned retarder film, and are formed at the positions corresponding to the first black stripes.

6. The stereoscopic image display of claim 5, further comprising a TAC film formed between the second black stripes and the patterned retarder film.

7. The stereoscopic image display of claim 6, further comprising the third black stripes formed between the TAC film and the patterned retarder film, and formed at the positions corresponding to the second black stripes.

8. The stereoscopic image display of claim 2, wherein the width of at least either the first black stripes, or the second black stripes, or the third black stripes is less than the width of the black matrix.

9. The stereoscopic image display of claim 2, wherein the area of at least either the first black stripes, or the second black stripes, or the third black stripes is less than or equal to the area of the black matrix within the regions corresponding to the black matrix.

10. The stereoscopic image display of claim 2, wherein the area of at least either the first black stripes, or the second black stripes, or the third black stripes contains carbon black.

11. A method for manufacturing a stereoscopic image display, the method comprising:
forming a thin film transistor array substrate;
forming black matrix on a surface of a color filter substrate;
forming color filters on the black matrix;
joining the thin film transistor array substrate and the color filter substrate together;
forming first black stripes on the other surface of the color filter substrate, at positions corresponding to the black matrix;
bonding a patterned retarder film onto the first black stripes; and
forming second black stripes between the first black stripes and the patterned retarder film.

12. The method of claim 11, wherein an align key is formed on a surface of the color filter substrate simultaneously with the formation of the black matrix.

13. The method of claim 12, wherein the forming of the first black stripes comprises:
forming a first black stripe layer by applying a first black stripe composition on the other surface of the color filter substrate;
aligning a mask by using the align key; and
forming the first black stripes by exposing the first black stripe layer through the mask.

14. The method of claim 13, further comprising forming a rear ITO prior to or after the formation of the first black stripes.

15. The method of claim 11, further comprising, prior to the bonding of the patterned retarder film onto the first black stripes:
bonding a polarization plate onto the first black stripes;
forming a second black stripe layer by applying a second black stripe composition onto the polarization plate;
aligning a mask by using the align key; and
forming the second black stripes by exposing the second black stripe layer through the mask.

16. The method of claim 15, further comprising forming third black stripes between the second black stripes and the patterned retarder film.

17. The method of claim 16, further comprising, after the forming of the second black stripes:
bonding a TAC film onto the second black stripes;
forming a third black stripe layer by applying a third black stripe composition onto the TAC film;
aligning a mask by using the align key; and
forming the third black stripes by exposing the third black stripe layer through the mask.

18. A method for manufacturing a stereoscopic image display, the method comprising:
forming a thin film transistor array substrate;
forming first black stripes on a surface of a color filter substrate;
forming black matrix on the other surface of the color filter substrate, at positions corresponding to the first black stripes;
forming color filters on the black matrix;
bonding a patterned retarder film onto the first black stripes; and
forming second black stripes between the first black stripes and the pattered retarder film.

19. The method of claim 18, wherein an align key is formed on a surface of the color filter substrate simultaneously with the formation of the first black stripes.

20. The method of claim 19, wherein the forming of the black matrix comprises:
forming a black matrix layer by applying a black matrix composition on the other surface of the color filter substrate;
aligning a mask by using the align key; and
forming the black matrix by exposing the black matrix layer through the mask.

21. The method of claim 20, further comprising forming a rear ITO prior to or after the formation of the first black stripes.

22. The method of claim 18, further comprising, prior to the bonding of a patterned retarder film onto the first black stripes:
bonding a polarization plate onto the first black stripes;
forming a second black stripe layer by applying a second black stripe composition onto the polarization plate;
aligning a mask by using the align key; and
forming second black stripes by exposing the second black stripe layer through the mask.

23. The method of claim 22, further comprising forming third black stripes formed between the second black stripes and the pattered retarder film.

24. The method of claim 23, further comprising, after the forming of the second black stripes:
   bonding a TAC film onto the second black stripes;
   forming a third black stripe layer by applying a third black stripe composition onto the TAC film;
   aligning a mask by using the align key; and
   forming the third black stripes by exposing the third black stripe layer through the mask.

25. The method of claim 24, further comprising, after the formation of color filters:
   forming a color filter substrate by forming an overcoat layer and a contact spacer on the color filters; and
   joining the thin film transistor array substrate and the color filter substrate together.

* * * * *